US010815357B2

(12) United States Patent
Kverel et al.

(10) Patent No.: US 10,815,357 B2
(45) Date of Patent: Oct. 27, 2020

(54) COATING INCLUDING INORGANIC FULLERENE-LIKE PARTICLES AND INORGANIC TUBULAR-LIKE PARTICLES

(71) Applicant: Nanotech Industrial Solutions, Inc., Avenel, NJ (US)

(72) Inventors: Eugene Kverel, New York, NY (US); Ronen Kreizman, Rehovot (IL); George Diloyan, Cranford, NJ (US); Alon Shapira, Givatayim (IL)

(73) Assignee: NANOTECH INDUSTRIAL SOLUTIONS, INC, Avenel, NJ (US)

(*) Notice: Subject to any disclaimer, the term of this patent is extended or adjusted under 35 U.S.C. 154(b) by 82 days.

(21) Appl. No.: 14/180,955

(22) Filed: Feb. 14, 2014

(65) Prior Publication Data

US 2014/0235513 A1 Aug. 21, 2014

Related U.S. Application Data

(60) Provisional application No. 61/766,898, filed on Feb. 20, 2013, provisional application No. 61/766,399, filed on Feb. 19, 2013.

(51) Int. Cl.
*C08K 3/30* (2006.01)
*C08K 7/00* (2006.01)
(Continued)

(52) U.S. Cl.
CPC .............. *C08K 3/30* (2013.01); *C08K 7/00* (2013.01); *C10M 125/22* (2013.01);
(Continued)

(58) Field of Classification Search
CPC ... C08K 3/30; C08K 7/24; C08K 7/00; C08K 3/04; C08K 2003/3009; C10M 149/14; C10M 125/22; E21B 17/00
(Continued)

(56) References Cited

U.S. PATENT DOCUMENTS 7,510,760 B2   3/2009  Malshe et al.
7,641,886 B2 * 1/2010  Tenne ................. B01J 19/0013
                                          423/508
(Continued)

FOREIGN PATENT DOCUMENTS

EP    2568186 A1    3/2013
RU    2451861 C2    5/2011
(Continued)

OTHER PUBLICATIONS

Eidelman—"Metallic Films with Fullerene-Like WS2 (MoS2) Nanoparticles: Self-Lubricating Coatings with Potential Applications", O. Eidelman et al, from "Technological Innovations in Sensing and Detection of Chemical, Biological, Radiological, Nuclear Threats and Ecological Terrorism", NATO Science for Peace and Security Series A, Nov. 25, 2011.*
(Continued)

*Primary Examiner* — Michael B Cleveland
*Assistant Examiner* — Michael G Miller
(74) *Attorney, Agent, or Firm* — Tutunjian & Bitetto, P.C.

(57) ABSTRACT

In one embodiment, a coating is provided that includes a deposition surface, and a coating on the deposition surface. The coating may include particles of a metal chalcogenide comprising a fullerene-like geometry, a tubular-like geometry or a combination of fullerene-like geometries and tubular-like geometries. The metal chalcogenide composition has a molecular formula of $MX_2$.

9 Claims, 6 Drawing Sheets

(51) Int. Cl.
*E21B 17/00* (2006.01)
*C10M 125/22* (2006.01)
*C10M 149/14* (2006.01)
*C08K 3/04* (2006.01)
*C25D 15/00* (2006.01)
*C23C 30/00* (2006.01)

(52) U.S. Cl.
CPC .......... *C10M 149/14* (2013.01); *C23C 30/00* (2013.01); *C25D 15/00* (2013.01); *E21B 17/00* (2013.01); *C08K 3/04* (2013.01); *C08K 3/041* (2017.05); *C08K 2003/3009* (2013.01)

(58) Field of Classification Search
USPC .................................................. 427/165–178
See application file for complete search history.

(56) References Cited

U.S. PATENT DOCUMENTS

| | | | |
|---|---|---|---|
| 8,486,870 B1 | 7/2013 | Malshe | |
| 8,492,319 B2 | 7/2013 | Malshe et al. | |
| 2002/0182331 A1 | 12/2002 | Oldiges et al. | |
| 2003/0144155 A1* | 7/2003 | Tenne | C22C 32/0089 508/103 |
| 2005/0065044 A1* | 3/2005 | Migdal | C10M 171/06 508/230 |
| 2006/0063637 A1* | 3/2006 | Law | C23C 14/0623 475/331 |
| 2007/0111319 A1 | 5/2007 | Bastide et al. | |
| 2007/0215360 A1 | 9/2007 | Shuster et al. | |
| 2008/0008838 A1* | 1/2008 | Arpac | C08G 18/3812 427/386 |
| 2008/0234149 A1* | 9/2008 | Malshe | C10M 141/10 508/150 |
| 2009/0032499 A1* | 2/2009 | Tenne | A61C 7/14 216/109 |
| 2010/0101828 A1 | 4/2010 | Duarte Pena et al. | |
| 2011/0162751 A1* | 7/2011 | Fitzgerald | C23C 30/00 138/145 |
| 2012/0329686 A1 | 12/2012 | Tenne et al. | |
| 2014/0162915 A1* | 6/2014 | Hatfield | C10M 125/22 508/167 |

FOREIGN PATENT DOCUMENTS

| | | |
|---|---|---|
| WO | 2006123336 A2 | 11/2006 |
| WO | 2011/004053 A1 | 1/2011 |
| WO | 2012/171243 A1 | 12/2012 |

OTHER PUBLICATIONS

Rapoport et al ("Inorganic fullerene-like material as additives to lubricants: structure-function relationship", Rapoport et al, Wear 225-229 (1999) 975-982 (Year: 1999).*

International Search Report and Written Opinion dated Jun. 10, 2014 for International Appl. No. PCT/US2014/016907.

International Search Report and Written Opinion dated Jul. 24, 2014 for International Appl. No. No. PCT/US2014/016928.

Hou, X. et al., "Microstructures and tribological properties of PEEK-based nanocomposite coatings incorporating inorganic fullerene-like nanoparticles" Surface and Coatings Technology (Feb. 2008) pp. 2287-2291, vol. 202, No. 11.

Supplementary Partial European Search Report dated Sep. 16, 2016 issued in European Application No. EP 14753582.

European Office Action dated Jan. 25, 2019 issued in European Application No. EP 14 753 582.7, pp. 1-4.

* cited by examiner ated Feb. 19, 2013, titled "Composite
COATING INCLUDING INORGANIC FULLERENE-LIKE PARTICLES AND INORGANIC TUBULAR-LIKE PARTICLES

CROSS REFERENCE TO RELATED APPLICATIONS

This application claims the benefit of U.S. Provisional Application No. 61/766,898 filed Feb. 20, 2013, titled "Coating including inorganic fullerene-like particles and inorganic tubular-like particles" and U.S. Provisional Application No. 61/766,399 filed Feb. 19, 2013, titled "Composite materials including fullerene-like hollow particles and inorganic tubular-like particles in a polymer matrix", which are both incorporated herein in their entirety by reference.

FIELD OF THE INVENTION

The present disclosure relates to lubricating coatings.

BACKGROUND

Every year damage caused by insufficient lubrication and wear is extremely costly. When components are moved under force with respect to each other, properties like coefficient of friction, frictional force and resistance against abrasion have a decisive influence on the operability and service life of processes and systems. Moreover, the requirements which need to be met by tribological systems are continually increasing. Customers are demanding smaller size and lower weight, while at the same time increasing performance and often also customers are demanding lubricant-free operation.

SUMMARY OF THE INVENTION

In one embodiment of the present disclosure, a coating is provided that includes an inorganic material of a metal chalcogenide. The inorganic material of the metal chalcogenide has a fullerene-like geometry and/or has a tubular-like geometry. The metal chalcogenide composition has a molecular formula of $MX_2$, where M is a metallic element selected from the group consisting of titanium (Ti), vanadium (V), chromium (Cr), manganese (Mn), iron (Fe), cobalt (Co), nickel (Ni), copper (Cu), zinc (Zn), zirconium (Zr), niobium (Nb), molybdenum (Mo), technetium (Tc), ruthenium (Ru), rhodium (Rh), palladium (Pd), silver (Ag), cadmium (Cd), hafnium (Hf), tantalum (Ta), tungsten (W), rhenium (Re), osmium (Os), iridium (Ir), platinum (Pt), gold (Au), mercury (Hg) and combinations thereof, and X is a chalcogen element selected from the group consisting of sulfur (S), selenium (Se), tellurium (Te), oxygen (O) and combinations thereof. The inorganic material of the metal chalcogenide having the molecular formula $MX_2$ is present in the coating in an amount of greater than 0.1 wt %.

In another embodiment, a polymeric coating is provided that includes an inorganic material of a metal chalcogenide. The metal chalcogenide has a fullerene-like geometry and/or has a tubular-like geometry. The metal chalcogenide composition has a molecular formula of $MX_2$, where M is a metallic element selected from the group consisting of titanium (Ti), vanadium (V), chromium (Cr), manganese (Mn), iron (Fe), cobalt (Co), nickel (Ni), copper (Cu), zinc (Zn), zirconium (Zr), niobium (Nb), molybdenum (Mo), technetium (Tc), ruthenium (Ru), rhodium (Rh), palladium (Pd), silver (Ag), cadmium (Cd), hafnium (Hf), tantalum (Ta), tungsten (W), rhenium (Re), osmium (Os), iridium (Ir), platinum (Pt), gold (Au), mercury (Hg) and combinations thereof, and X is a chalcogen element selected from the group consisting of sulfur (S), selenium (Se), tellurium (Te), oxygen (O) and combinations thereof. The inorganic material of the metal chalcogenide having the molecular formula $MX_2$ is present in polymeric base material in an amount of greater than 0.1 wt %.

In another aspect of the disclosure, a coating method is provided that includes providing a deposition surface, and depositing by a physical vapor deposition (PVD) method a coating on the deposition surface. The coating includes particles of a metal chalcogenide having at least one of a fullerene-like geometry and a tubular-like geometry. The metal chalcogenide composition has a molecular formula of $MX_2$, in which M is a metallic element selected from the group consisting of titanium (Ti), vanadium (V), chromium (Cr), manganese (Mn), iron (Fe), cobalt (Co), nickel (Ni), copper (Cu), zinc (Zn), zirconium (Zr), niobium (Nb), molybdenum (Mo), technetium (Tc), ruthenium (Ru), rhodium (Rh), palladium (Pd), silver (Ag), cadmium (Cd), hafnium (Hf), tantalum (Ta), tungsten (W), rhenium (Re), osmium (Os), iridium (Ir), platinum (Pt), gold (Au), mercury (Hg) and combinations thereof, and X is a chalcogen element selected from the group consisting of sulfur (S), selenium (Se), tellurium (Te), oxygen (O) and combinations thereof.

In another aspect of the present disclosure, a coating method is provided that includes depositing by an electroplating method a coating on a deposition surface. The coating includes particles of a metal chalcogenide having at least one of a fullerene-like geometry and a tubular-like geometry. The metal chalcogenide composition has a molecular formula of $MX_2$, wherein M is a metallic element selected from the group consisting of titanium (Ti), vanadium (V), chromium (Cr), manganese (Mn), iron (Fe), cobalt (Co), nickel (Ni), copper (Cu), zinc (Zn), zirconium (Zr), niobium (Nb), molybdenum (Mo), technetium (Tc), ruthenium (Ru), rhodium (Rh), palladium (Pd), silver (Ag), cadmium (Cd), hafnium (Hf), tantalum (Ta), tungsten (W), rhenium (Re), osmium (Os), iridium (Ir), platinum (Pt), gold (Au), mercury (Hg) and combinations thereof, and X is a chalcogen element selected from the group consisting of sulfur (S), selenium (Se), tellurium (Te), oxygen (O) and combinations thereof.

In yet another aspect, a coating method is provided that includes providing a deposition surface; and depositing by solvent transport medium a coating on the deposition surface that includes particles of a metal chalcogenide comprising a fullerene-like geometry, a tubular-like geometry or a combination of fullerene-like geometries and tubular-like geometries particles. The metal chalcogenide composition has a molecular formula of $MX_2$, wherein M is a metallic element selected from the group consisting of titanium (Ti), vanadium (V), chromium (Cr), manganese (Mn), iron (Fe), cobalt (Co), nickel (Ni), copper (Cu), zinc (Zn), zirconium (Zr), niobium (Nb), molybdenum (Mo), technetium (Tc), ruthenium (Ru), rhodium (Rh), palladium (Pd), silver (Ag), cadmium (Cd), hafnium (Hf), tantalum (Ta), tungsten (W), rhenium (Re), osmium (Os), iridium (Ir), platinum (Pt), gold (Au), mercury (Hg) and combinations thereof, and X is a chalcogen element selected from the group consisting of sulfur (S), selenium (Se), tellurium (Te), oxygen (O) and combinations thereof.

In yet a further embodiment, a coating method is provided that includes providing a deposition surface; and depositing a composite polymeric coating on the deposition surface that includes polymeric base material and a dispersed phase of a metal chalcogenide comprising a fullerene-like geometry, a tubular-like geometry or a combination of fullerene-like geometries and tubular-like geometries particles. The metal chalcogenide composition has a molecular formula of $MX_2$, wherein M is a metallic element selected from the group consisting of titanium (Ti), vanadium (V), chromium (Cr), manganese (Mn), iron (Fe), cobalt (Co), nickel (Ni), copper (Cu), zinc (Zn), zirconium (Zr), niobium (Nb), molybdenum (Mo), technetium (Tc), ruthenium (Ru), rhodium (Rh), palladium (Pd), silver (Ag), cadmium (Cd), hafnium (Hf), tantalum (Ta), tungsten (W), rhenium (Re), osmium (Os), iridium (Ir), platinum (Pt), gold (Au), mercury (Hg) and combinations thereof, and X is a chalcogen element selected from the group consisting of sulfur (S), selenium (Se), tellurium (Te), oxygen (O) and combinations thereof.

BRIEF DESCRIPTION OF THE DRAWINGS

The following detailed description, given by way of example and not intended to limit the disclosure solely thereto, will best be appreciated in conjunction with the accompanying drawings, wherein like reference numerals denote like elements and parts, in which.

DETAILED DESCRIPTION

Figure 1:
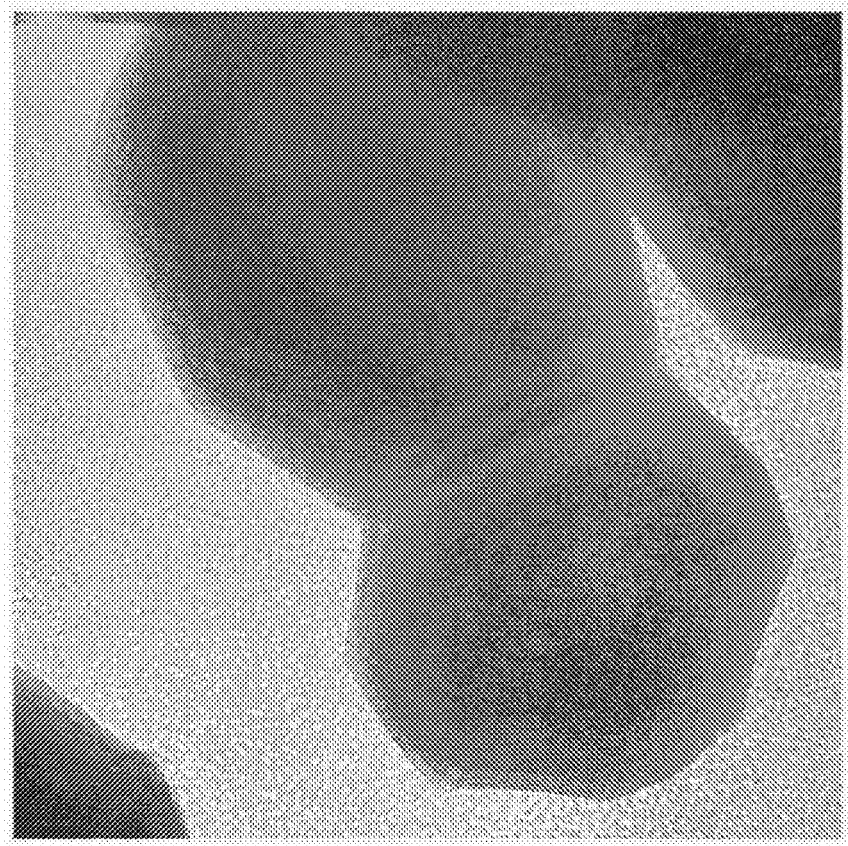
FIG. 1 is a transmission electron microscope (TEM) image of a metal chalcogenide having a molecular formula $MX_2$ and a fullerene-like geometry, in accordance with one embodiment of the present disclosure.

Detailed embodiments of the present disclosure are described herein; however, it is to be understood that the disclosed embodiments are merely illustrative of the compositions, structures and methods of the disclosure that may be embodied in various forms. In addition, each of the examples given in connection with the various embodiments are intended to be illustrative, and not restrictive. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the compositions, structures and methods disclosed herein. References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment.

In one embodiment, a coating is provided that includes an inorganic material of a metal chalcogenide composition having a fullerene-like geometry and/or tubular-like geometry. The metal chalcogenide composition has a molecular formula of $MX_2$, where M is a metallic element selected from the group consisting of titanium (Ti), vanadium (V), chromium (Cr), manganese (Mn), iron (Fe), cobalt (Co), nickel (Ni), copper (Cu), zinc (Zn), zirconium (Zr), niobium (Nb), molybdenum (Mo), technetium (Tc), ruthenium (Ru), rhodium (Rh), palladium (Pd), silver (Ag), cadmium (Cd), hafnium (Hf), tantalum (Ta), tungsten (W), rhenium (Re), osmium (Os), iridium (Ir), platinum (Pt), gold (Au), mercury (Hg) and combinations thereof, and X is a chalcogen element selected from the group consisting of sulfur (S), selenium (Se), tellurium (Te), oxygen (O) and combinations thereof. In one example, the metal chalcogenide composition is tungsten disulfide ($WS_2$). The particles of the metal chalcogenide can be functionalized with at least one of non-anionic surfactants, anionic surfactants, cationic surfactants, zwitterionic surfactants, surfactants, silanes, thiols, polymers and dopants.

The deposition surface that the coating is formed on may be composed of metals, such as steel, aluminum, copper alloys, and zinc alloys. In other examples, the deposition surface that the coating is formed on may be a dielectric, polymeric or ceramic material. In some other examples, the deposition surface may be a semiconductor material. The coating composition may further include a base material layer selected from the group consisting of chrome (Cr), chromium oxide ($Cr_2O_3$), diamond like carbon (DLC), silicon carbide (SiC), silicon nitride ($Si_3N_4$), titanium carbide (TiC), nickel titanium (NiTi), aluminum oxide ($AhO_3$), boron carbide ($B_4C$), boron, tungsten cobalt (WCo) and combinations thereof. In some embodiments, the base material layer provides the majority of the coating.

In some embodiments, the base material for the coating composition is a polymeric material. In one example, base material is provided by an elastomer. An elastomer is a cross-linked, amorphous polymer when above its glass transition temperature. Each of the monomers, which link to form the polymer in an elastomer is usually made of carbon, hydrogen, oxygen and/or silicon. At ambient temperatures, elastomers are relatively soft, e.g., E-3 MPa, and deformable. Elastomers are usually thermosets (requiring vulcanization), but may also be thermoplastic. The long polymer chains cross-link during curing, i.e., vulcanizing. The elasticity is derived from the ability of the long chains to reconfigure themselves to distribute an applied stress. The covalent cross-linkages ensure that the elastomer will return to its original configuration when the stress is removed. As a result of this extreme flexibility, elastomers can reversibly extend from 5-700%, depending on the specific material, without the cross-linkages or with short, uneasily reconfigured chains, the applied stress would result in a permanent deformation.

Examples of elastomers that are suitable for use with the present disclosure include unsaturated rubbers that can be cured by sulfur vulcanization, which include, but are not limited to: natural polyisoprene: cis-1,4-polyisoprene natural rubber (NR) and trans-1,4-polyisoprene gutta-percha; synthetic polyisoprene (IR for Isoprene Rubber); polybutadiene (BR for Butadiene Rubber); chloroprene rubber (CR), polychloroprene, neoprene, baypren etc; butyl rubber (copolymer of isobutylene and isoprene, IIR); halogenated butyl rubbers (chloro butyl rubber: CIIR; bromo butyl rubber: BIIR); styrene-butadiene rubber (copolymer of styrene and butadiene, SBR); nitrile rubber (copolymer of butadiene and acrylonitrile, NBR) (also called Buna N rubbers); hydrogenated nitrile rubbers (HNBR); therban; and zetpol.

In another embodiment, examples of elastomers that are suitable for use with the present disclosure include saturated rubbers that cannot be cured by sulfur vulcanization, which include, but are not limited to: EPM (ethylene propylene rubber, a copolymer of ethylene and propylene) and EPDM rubber (ethylene propylene diene rubber, a terpolymer of ethylene, propylene and a diene-component); Epichlorohydrin rubber (ECO); Polyacrylic rubber (ACM, ABR); Silicone rubber (SI, Q, VMQ); Fluorosilicone Rubber (FVMQ); Fluoroelastomers (FKM, and FEPM) Viton, Tecnoflon, Fluorel, Aflas and Dai-El; Perfluoroelastomers (FFKM) Tecnoflon PFR, Kalrez, Chemraz, Perlast; Polyether block amides (PEBA); Chlorosulfonated polyethylene (CSM); Ethylene-vinyl acetate (EVA) and combinations thereof.

Other types of elastomers that are suitable for use with the present disclosure include thermoplastic elastomers (TPE); the proteins resilin and elastin; and polysulfide rubber. In some embodiments, when an elastomer serves as the base material of the coating having a dispersed phase of an inorganic material of a metal chalcogenide composition with a fullerene-like or tubular-like geometry, the mechanical properties of the coating including the fullerene-like or tubular-like geometry inorganic material of metal chalcogenide composition are greater than the elastomer by itself. For example, the stress strain behavior of the coating is increased in comparison to the performance of the elastomer without the dispersed phase of the fullerene-like or tubular-like geometry inorganic material of metal chalcogenide composition. The coating also has greater lubricating qualities that the elastomer by itself.

In another embodiment, the polymer that is selected for the base material of the coating may be an epoxy. Epoxies are typically thermosetting. Epoxy resins, also known as polyepoxides are a class of reactive prepolymers and polymers which contain epoxide groups. Epoxy resins may be reacted (cross-linked) either with themselves through catalytic homopolymerization, or with a wide range of co-reactants including polyfunctional amines, acids (and acid anhydrides), phenols, alcohols and thiols. These co-reactants are often referred to as hardeners or curatives, and the cross-linking reaction is commonly referred to as curing. Epoxy compositions that are suitable for use with the present disclosure may include bisphenol A epoxy resin, bisphenol F epoxy resin, novolac epoxy resin, aliphatic epoxy resin, glycidylamine epoxy resin and combinations thereof. One example of the repeating unit for an epoxy that is suitable for use with the present disclosure is a diglycidyl: ether of bisphenol A, DGEPA, as follows:

In some embodiments, when an epoxy serves as base layer for the coating having a dispersed phase of an inorganic material of a metal chalcogenide composition, such as tungsten disulfide ($WS_2$), with a fullerene like or tubular-like geometry, the mechanical properties of the coating are greater than the mechanical properties of the epoxy by itself. For example, the peel strength and shear strength performance of the coating including the epoxy base material and the inorganic materials of the metal chalcogenide composition with the fullerene-like or tubular-like geometry is greater than the peel strength and shear strength performance of the epoxy by itself, i.e., the epoxy without the dispersed phase of an inorganic material of a metal chalcogenide composition with a fullerene like or tubular-like geometry.

In some embodiments, the inclusion of the dispersed phase of an inorganic material of the metal chalcogenide composition with the fullerene-like or tubular-like geometry can double the peel strength and shear strength performance of the composite when compared to the epoxy. Impact strength is also increased. Energy absorbance, as indicated from the area under the stress-strain curve (e.g. of a tensile test according to ASTM D638) is also increased when compared to epoxy.

In another embodiment, the polymer for the base material of the coating may be a thermoplastic material, such as polyether ether ketone (PEEK) and polypropylene (PP). PEEK polymers are obtained by step-growth polymerization by the dialkylation of bisphenolate salts. When PEEK is employed as the matrix, e.g., base material, of a coating including a dispersed phase of inorganic materials of the metal chalcogenide composition with the fullerene-like or tubular-like geometry, the mechanical properties of the coating are greater than the mechanical properties of PEEK without the dispersed phase of inorganic materials. For example, the Young's modulus may be doubled by the inclusion of the dispersed phase of inorganic materials of the metal chalcogenide composition with the fullerene-like or tubular-like geometry into a matrix of PEEK. Impact strength is also increased. Applications for PEEK in accordance with the present disclosure include medical implants, aerospace structures, automotive structures, bearings, piston parts, pumps, compressor plate valves, and cable insulation.

Polypropylene (PP) is an addition polymer made from the monomer propylene. Low-density polyethylene (LDPE) and high-density polyethylene (HDPE) are both suitable for use with the present disclosure, as well as other density characterizations for polypropylene (PP). Polypropylene (PP) may be suitable for use as the base material of a coating in accordance with the present disclosure, and is suitable for use in automotive and aerospace applications. Polypropylene (PP) may also be suitable for coatings used in shielding piping and wire cable sheathing applications. The mechanical properties and impact strength of polypropylene (PP) is increased by incorporation of a dispersed phase of inorganic

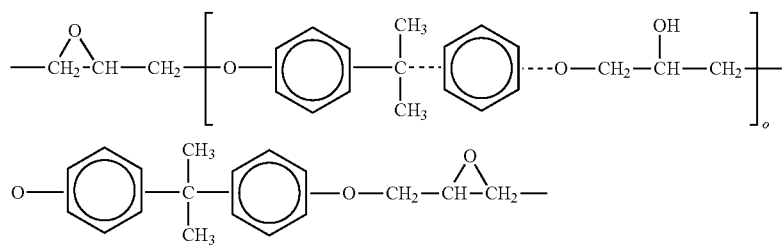

material having a metal chalcogenide composition with a fullerene-like or tubular like geometry.

In another embodiment, the polymer for the base material of the coating may be a polyamide. A polyamide is a polymer containing monomers of amides joined by peptide bonds. An amide group has the formula —$CONH_2$. An amide link has this structure:

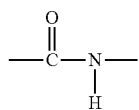

The polyamide polymer may have a high crystallinity, a low crystallinity or may be amorphous. Polyamide polymers that are suitable for use with the present disclosure may be homopolymers or copolymers. The polyamide polymers may aliphatic, semi aromatic, aromatic or a combination thereof.

In one embodiment, the polyamide used for the base material of the coating may be nylon. Nylon may be an aliphatic polymer. In nylon, the repeating units contain chains of carbon atoms. There are various different types of nylon depending on the nature of those chains. Examples of nylons that may be suitable for use as the base material layer of the coating may include nylon-6,6; nylon-6; nylon-6,9; nylon-6,10; nylon-6,12; nylon-11; nylon-12 and nylon-4,6. The repeating unit for nylon-6 is as follows:

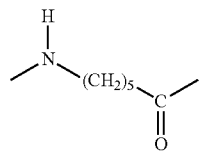

The repeating unit for nylon 6-6 is as follows:

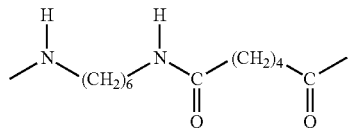

In some embodiments, nylons are condensation copolymers formed by reacting equal parts of a diamine and a dicarboxylic acid, so that amides are formed at both ends of each monomer in a process analogous to polypeptide biopolymers. Chemical elements included are carbon, hydrogen, nitrogen, and oxygen.

In another embodiment, the polyamide for the base layer of the coating is kevlar. Kevlar is similar in structure to nylon-6,6 except that instead of the amide links joining chains of carbon atoms together, they join benzene rings.

In another embodiment, the polyamide used for the base material of the coating may be polyphthalamide (aka. PPA, High Performance Polyamide). PPA is a thermoplastic synthetic resin of the polyamide (nylon) family. PPA's are polyamides containing aromatic rings in their backbones, which gives them high mechanical strength and thermal resistance. The term PPA is used when 60% or more moles of the carboxylic acid portion of the repeating unit in the polymer chain is composed of a combination of terephthalic (TPA) and isophthalic (IPA) acids. PPA's may be a semi-crystalline material composed from a diacid and a diamine. PPA is typically formed by the reaction of aromatic acids with aliphatic diamines. In some embodiments, the diacid portion contains at least 55% terephthalic acid (TPA) or isophthalic acid (IPA). Molar masses for PPA's made with direct polycondensation techniques range between 12,000 and 16,000 g/mol.

In another embodiment, the polyamide used for the base material of the coating may be a polyphthalamide blend. For example, the base material of the coating may be composed of at least one of polyphthalamide/polyamide blends and polyphthalamide/polyamide/polyolefin blends.

Other polyamides that are suitable for use as the base material of the coating include polyvinyl chloride (PVC), polyester (PES), polyethermide (PEI) and polyphenylene sulfide (PPS).

In some embodiments, the base material of the coating may be composed of polyamide-imides. The polyamide-imides may be thermosetting or thermoplastic amorphous polymers. Polamide-imide polymers include a polymer chain that comprises amide linkages alternating with imide linkages. The mer unit for one example of a polyamide-imide used in accordance with the present disclosure is as follows:

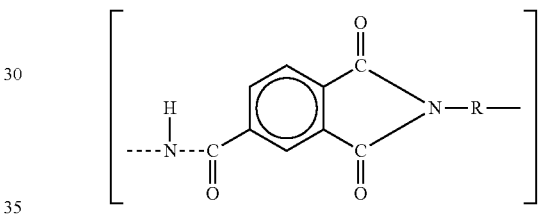

Polyamide-imides may be made from isocyanates and TMA (trimellic acid-anhydride) in N-methylpyrrolidone (NMP). For example, one route to the formation of polyamide-imides is the condensation of an aromatic diamine, such as methylene dianiline (MDA) and trimellitic acid chloride (TMAC). Reaction of the anhydride with the diamine produces an intermediate amic acid. The acid chloride functionality reacts with the aromatic amine to give the amide bond and hydrochloric acid (HCl) as a by-product. In the commercial preparation of polyamideimides, the polymerization is carried out in a dipolar, aprotic solvent such as N-methylpyrrolidone (NMP), dimethylacetamide (DMAC), dimethylformamide (DMF), or dimethylsulfoxide (DMSO) at temperatures between 20-60° C. The byproduct hydrochloric acid (HCl) is typically neutralized in situ or removed by washing it from the precipitated polymer. In another example, polyamide-imides may be formed by reacting diisocyanate, often 4,4'-methylenediphenyldiisocyanate (MDI), with trimellitic anhydride (TMA). Polyamide-imides that are suitable for the methods and structures disclosed herein may be available from Solvay Advanced Polymers under the trademark Torlon, such as Torlon 4301, Torlon ai-10, Torlon ai-10 LM or Torlon 4000. Polyamide-imides (PAI) may be used in conjunction with fluoropolymers.

In some embodiments, the base layer of the coating may be provided by polyethylene (PE). The term polyethylene describes a family of resins obtained by polymerizing ethylene gas, $H_2C=CH_2$. In some examples, low density polyethylene typically has a density value ranging from 0.91 to 0.925 g/cm$^3$, linear low density polyethylene is in the range of 0.918 to 0.94 g/cm³, while high density polyethylene ranges from 0.935 to 0.96 g/cm³ and above.

In another embodiment, the base layer of the coating may be cross linked polyethylene (PEX). Typically, PEX is made from high density polyethylene (HDPE). cross linked polyethylene (PEX) contains cross-linked bonds in the polymer structure, changing the thermoplastic to a thermoset. In one embodiment, in order to be classified as being cross linked polyethylene (PEX), the required degree of cross-linking, according to ASTM Standard F 876-93, is between 65% and 89%.

In yet another embodiment, the polymer for the base layer of the coating may be a polyester. Polyester is a category of polymers which contain the ester functional group in their main chain. In some examples, polyester that is suitable for the base layer of the coating may include polybutylene terephthalate (PBT) and polyethylene terephthalate (PET). The repeating unit of polybutylene terephthalate (PBT) is as follows:

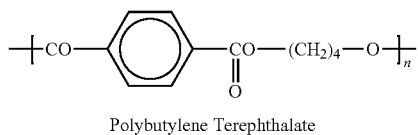

Polybutylene Terephthalate

The repeating unit of polyethylene terephthalate (PET) is as follows:

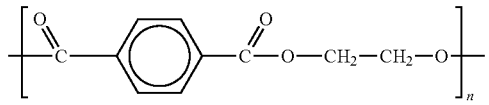

Polyesters are synthesized by reacting an organic acid, in this case terephthalic acid, with an alcohol. In the case of polybutylene terephthalate (PBT), the alcohol is generically referred to as butylene glycol, while in polyethylene terephthalate (PET) it is ethylene glycol. The resulting polymers are known, therefore, as polybutylene terephthalate (PBT) and polyethylene terephthalate (PET).

In one embodiment, the inorganic material of the metal chalcogenide having the molecular formula $MX_2$ with the fullerene-like geometry and/or tubular-like geometry is present in the coating in an amount of greater than 0.1 wt %. For example, the inorganic material of the metal chalcogenide having the molecular formula $MX_2$ may be present in the coating in an amount ranging from 0.1 wt % to 99.5 wt %. In yet another example, the inorganic material of the metal chalcogenide having the molecular formula $MX_2$ may be present in the coating in an amount ranging from 0.5 wt % to 70 wt %. In some examples, the inorganic material of the metal chalcogenide having the molecular formula $MX_2$ may be present in the coating in an amount greater than 0.01% by volume.

In some embodiments, such as when the coating includes a polymeric base material layer, the coating may be a composite structure. A composite, such as a composite coating, is a material composed of two or more distinct phases, e.g., matrix phase and dispersed phase, and having bulk properties different from those of any of the constituents by themselves. As used herein, the term "matrix phase" denotes the phase of the composite, and contains the dispersed phase, and shares a load with it. In some embodiments, the matrix phase may be the majority component of the composite coating. In some embodiments, when the coating includes a polymeric base material layer, the matrix phase may be provided by the polymer base material layer. As used herein, the term "dispersed phase" denotes a second phase (or phases) that is embedded in the matrix phase of the composite. A composite coating in accordance with the present disclosure includes a dispersed phase of an inorganic material of a metal chalcogenide composition with a fullerene-like or tubular-like geometry that is present in a second material that provides a matrix phase.

In other embodiments, substantially the entire coating is comprised of the inorganic material of a metal chalcogenide composition having a fullerene-like geometry and/or tubular-like geometry.

The component of the coating that is provided by the inorganic material of the metal chalcogenide composition may have a fullerene-like geometry. As used herein, the term "fullerene-like" denotes a sphere like geometry. The core of the fullerene-like geometry may be hollow, solid, amorphous, or a combination of hollow, solid and amorphous portions. A fullerene like geometry may also be referred to as having a cage geometry. In one example, an inorganic material having the metal chalcogenide composition with a fullerene like geometry may be a cage geometry that is hollow at its core and layered at is periphery. In another example, an inorganic material having the metal chalcogenide composition with a fullerene like geometry may be a cage geometry that is solid at its core and layered at is periphery. For example, the inorganic material having the metal chalcogenide composition and the fullerene like geometry may be a single layer or double layered structure. The inorganic material having the metal chalcogenide composition and the fullerene like geometry is not limited on only single layer or double layered structures, as the inorganic material may have any number of layers. For example, the metal chalcogenide composition may be layered to include 5 layers to 100 layers of metal chalcogenide material that can exfoliate from the particle. In another embodiment, the metal chalcogenide composition may be layered to include 10 layers to 50 layers of metal chalcogenide material that can exfoliate from the particle. In yet another embodiment, the metal chalcogenide composition may be layered to include 15 layers to 20 layers of metal chalcogenide material that can exfoliate from the particle. These structures are also referred to in the art as being "nested layer structures".

One example of an inorganic material having the metal chalcogenide composition and the fullerene like geometry fullerene-like geometry is depicted in FIG. 1. FIG. 1 depicts a transmission electron microscope (TEM) image of an inorganic material having a tungsten disulfide ($WS_2$) composition with a fullerene-like geometry. In another example, the inorganic material having the metal chalcogenide composition and the inorganic fullerene like geometry is composed of molybdenum disulfide ($MoS_2$). It is noted that the inorganic material with the fullerene-like geometry that is depicted in FIG. 1 is not limited to only tungsten disulfide ($WS_2$) and molybdenum disulfide ($MoS_2$). Inorganic materials with a metal chalcogenide composition and having a fullerene-like geometry may have any inorganic composition that meets the formula $MX_2$, where M is a metallic element selected from the group consisting of titanium (Ti), vanadium (V), chromium (Cr), manganese (Mn), iron (Fe), cobalt (Co), nickel (Ni), copper (Cu), zinc (Zn), zirconium (Zr), niobium (Nb), molybdenum (Mo), technetium (Tc), ruthenium (Ru), rhodium (Rh), palladium (Pd), silver (Ag), cadmium (Cd), hafnium (Hf), tantalum (Ta), tungsten (W), rhenium (Re), osmium (Os), iridium (Ir), platinum (Pt), gold (Au), mercury (Rg) and combinations thereof, and X is a chalcogen element selected from the group consisting of sulfur (S), selenium (Se), tellurium (Te), oxygen (O) and combinations thereof.

The inorganic material having the metal chalcogenide composition and fullerene-like geometry may have a diameter ranging from 1 nm to 15 microns. In another embodiment, the inorganic material having the metal chalcogenide composition and the fullerene-like geometry may have a diameter ranging from 2 nm to 10 microns. In yet another embodiment, the inorganic material having the metal chalcogenide composition and the fullerene-like geometry may have a diameter ranging from 5 nm to 5 microns. The inorganic material having the metal chalcogenide composition and the fullerene-like geometry may have a diameter that is any value within the above ranges. It is noted that the above dimensions are provided for illustrative purposes only, and are not intended to limit the present disclosure. In some embodiments, most of the nanoparticles will have diameters ranging between 20 nm to 500 nm, and even more typically will have diameters between 30 nm to 200 nm.

The component of the coating that is provided by the inorganic material of the metal chalcogenide composition may also have tubular-like geometry. As used herein, the term "tubular-like geometry" denotes a columnar or cylindrical geometry, in which one axis of the intercalation compound. In some embodiments, an inorganic material having the metal chalcogenide composition and the tubular-like geometry may be a cage geometry that is hollow at its core and layered at its periphery. In other embodiments, an inorganic material having the metal chalcogenide composition and the tubular-like geometry may be a cage geometry that is solid at its core, and/or amorphous at its core, and layered at its periphery. For example, the inorganic material having the metal chalcogenide composition and the tubular-like geometry may be a single layer or double layered structure. These structures are also referred to in the art as being "nested layer structures". The number of layers in the inorganic material having the metal chalcogenide composition and the tubular-like geometry may be similar to the number of layers in the inorganic material having the metal chalcogenide composition and the fullerene-like geometry. In some examples, the minimum number of layers for the inorganic material having the tubular-like geometry is approximately 4 layers.

Figure 2:
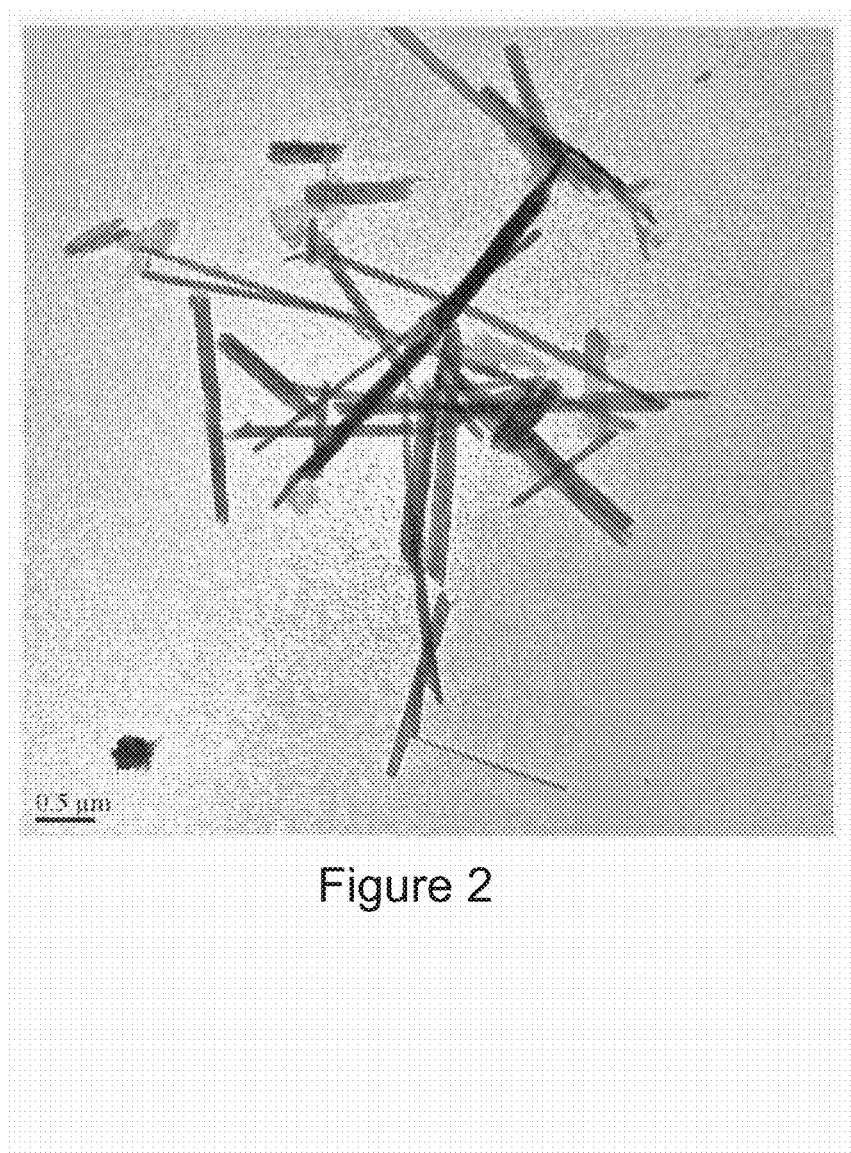
FIG. 2 is a transmission electron microscope (TEM) image of a metal chalcogenide having a molecular formula $MX_2$ and a tubular-like geometry, in accordance with one embodiment of the present disclosure.

One example of an inorganic material having the metal chalcogenide composition and the tubular-like geometry is depicted in FIG. 2. FIG. 2 depicts a transmission electron microscope (TEM) image of an intercalation compound having a tungsten disulfide ($WS_2$) composition with an inorganic tubular-like geometry. In another example, the inorganic material having the metal chalcogenide composition and the tubular-like geometry is composed of molybdenum disulfide ($MoS_2$). It is noted that the inorganic material having the metal chalcogenide composition and the tubular-like geometry that is depicted in FIG. 2 is not limited to only tungsten disulfide ($WS_2$) and molybdenum disulfide ($MoS_2$). Inorganic materials having a tubular-like geometry may have any inorganic composition that meets the formula $MX_2$, where M is a metallic element selected from the group consisting of titanium (Ti), vanadium (V), chromium (Cr), manganese (Mn), iron (Fe), cobalt (Co), nickel (Ni), copper (Cu), zinc (Zn), zirconium (Zr), niobium (Nb), molybdenum (Mo), technetium (Tc), ruthenium (Ru), rhodium (Rh), palladium (Pd), silver (Ag), cadmium (Cd), hafnium (Hf), tantalum (Ta), tungsten (W), rhenium (Re), osmium (Os), iridium (Ir), platinum (Pt), gold (Au), mercury (Hg), and combinations thereof, and X is a chalcogen element selected from the group consisting of sulfur (S), selenium (Se), tellurium (Te) and oxygen (O).

The inorganic materials having the metal chalcogenide composition and the tubular-like geometry may have a diameter, i.e., distance perpendicular to the greatest axis of the tubular-like geometry, ranging from 1 nm to 300 nm. In another embodiment, the inorganic materials having the metal chalcogenide composition and the tubular-like geometry may have a diameter ranging from 5 nm to 125 nm. In yet another embodiment, the inorganic materials have the metal chalcogenide composition and the tubular-like geometry with a diameter ranging from 10 nm to 100 nm. The inorganic materials having the metal chalcogenide composition and the tubular-like geometry may have a length, i.e., greatest axis of the tubular-like geometry, that ranges from 1 nm to 20 cm. In another embodiment, the inorganic materials having the metal chalcogenide composition and the tubular-like geometry may have a length, i.e., greatest axis of the tubular-like geometry, that ranges from 5 nm to 15 cm. In yet another embodiment, the inorganic materials having the metal chalcogenide composition and the tubular-like geometry may have a length, i.e., greatest axis of the tubular-like geometry, that ranges from 100 nm to 10 cm. The inorganic materials having the metal chalcogenide composition and the tubular-like geometry may have a length or diameter that is any value within the above ranges. It is noted that the above dimensions are provided for illustrative purposes only, and are not intended to limit the present disclosure.

The inorganic materials having the metal chalcogenide composition, e.g., $WS_2$, and the fullerene-like geometry and/or tubular-like geometry may be produced via sulfidization of tungsten oxide nanoparticles in reduction atmosphere in fluidized bed reactor. The inorganic materials having the metal chalcogenide composition and the fullerene-like geometry and/or tubular-like geometry may be formed in accordance with at least one of the methods disclosed in U.S. Pat. Nos. 6,217,843, 6,710,020, 6,841,142, 7,018,606 and 7,641,886, which are each incorporated herein in their entirety. It is noted that the methods disclosed in the aforementioned patents are only some examples of methods that are suitable for forming the inorganic materials having the metal chalcogenide composition and the fullerene-like and/or tubular-like geometry. Any method may be employed for forming the above-described inorganic materials having the metal chalcogenide composition, so long as the compound formed has a fullerene-like and/or tubular-like geometry.

In some embodiments, the coating may include a second dispersed phase of a carbon containing material, such as carbon nanotubes, e.g., single wall carbon nanotubes (CNT) or multi-wall carbon nanotubes (SWNT), or graphitic materials, such as carbon black (CB), graphitic fibers, diamond like carbon (DLC) and graphite platelets. The second dispersed phase of carbon containing materials could be used in polymer matrices for reinforcement or in order to obtain desired physical, chemical or mechanical properties.

In one embodiment, the carbon containing material that is provided by carbon nanotubes may have a high purity on the order of about 95% to about 99% carbon. In an even further embodiment, the carbon nanotubes have a high purity on the order of about 99% or greater. The diameter of a single wall carbon nanotube may range from about 1 nanometer to about 400 nanometers. In another embodiment, the diameter of a single wall carbon nanotube may range from about 1.2 nanometers to about 1.6 nanometers. In one embodiment, the nanotubes used in accordance with the present invention have an aspect ratio of length to diameter on the order of approximately 200:1. In the final coating, a carbon containing material may be present in the final coating in an amount ranging from 01 wt. % to 10 wt. %.

In some embodiments, in which the coating includes, a polymer base material, the carbon containing material may be present in the polymer matrix with the metal chalcogenide inorganic material with the fullerene-like or tubular-like geometry, wherein the carbon containing material is present in an amount ranging from 0.1 wt % to 60 wt. %. In another embodiment, the carbon containing material may be present in the polymer matrix in an amount ranging from 0.1 wt % to 40 wt. %. In yet another embodiment, the carbon containing material in the polymer matrix in an amount ranging from 0.1 wt % to 30 wt. %.

Figure 3A:
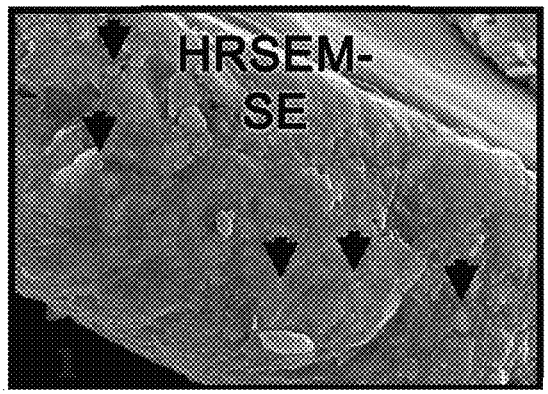
FIGS. 3A and 3B are scanning electron microscope (SEM) images of metal chalcogenide having a molecular formula $MX_2$ with a fullerene-like geometry that is dispersed within a polymer matrix, in accordance with one embodiment of the present disclosure.
Figure 3B:
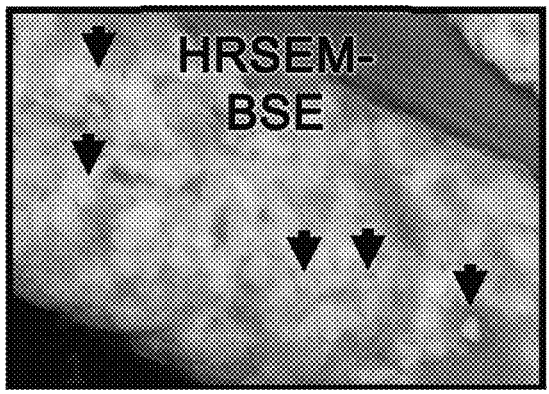

In one embodiment, the thickness of the coating including the base material and at least the inorganic materials having the metal chalcogenide composition and the fullerene-like geometry and/or tubular-like geometry may range from 5 microns to 50 mircons. In another embodiment, the thickness of the coating including the base material and the inorganic materials having the metal chalcogenide composition and the fullerene-like geometry and/or tubular-like geometry may range from 5 microns to 20 microns. In yet another embodiment, the thickness of the coating including the base material and the inorganic materials having the metal chalcogenide composition and the fullerene-like geometry and/or tubular-like geometry may range from 2 microns to 10 microns. FIGS. 3A and 3B depict one embodiment of a coating including a polymeric base material and a dispersed phase of nanospheres with a fullerene-like geometry and metal chalcogenide composition with a molecular formula $MX_2$, such as $WS_2$.

In one embodiment, the inorganic material having the metal chalcogenide composition and the fullerene-like geometry and/or tubular-like geometry is present in the polymeric base material at volume percent ranging from 0.001% to 80%. In another embodiment, the inorganic material having the metal chalcogenide composition and the fullerene-like geometry and/or tubular-like geometry is present in the polymeric base material at volume percent ranging from 0.01% to 30%.

In another aspect of the present disclosure, a deposition method is provided to form a coating including inorganic materials having the metal chalcogenide composition and the fullerene-like geometry and/or tubular-like geometry. In some embodiments, such as the methods of forming a coating including a polymeric base material, the deposition surface of the component being coated may be treated with a surface pre-treatment prior to being coated.

In some embodiments, the pre-treatment process modifies the surface of the substrate, i.e., modifies by a mechanism of surface exchange (not the addition of a new layer), in order to allow better wetting, coating, interlocking on the substrate surface, chemical computability and consequently to all of these, improved adhesion and coating performance. One example of a surface exchange methods that are suitable for use with the present disclosure include phosphating.

Phosphating is a chemical process for treating the deposition surface, such as an iron containing deposition surface, e.g., steel, whereby the metal-phosphate modified surfaces that are hardly soluble are formed on the base material. Phosphating of depositions surfaces including iron, such as carbon steel, may include manganese phosphate, zinc phosphate, iron phosphate and a combination thereof. In addition to iron and steel, other materials that may be treated using a phosphating pretreatment include zinc, cadmium, aluminum, tin and galvanized steel, and combinations thereof.

The metal-phosphate modified surfaced created by phosphating are porous, absorbent and are suitable without further treatment for coating. In some embodiments, the application of phosphate pre-treatment processes makes use of phosphoric acid and takes advantage of the low solubility of phosphates in medium or high pH solutions. Iron, zinc or manganese phosphate salts may be dissolved in a solution of phosphoric acid. In some embodiments, when a deposition surface of steel or iron parts is placed in the phosphoric acid, an acid and metal reaction takes place which locally depletes the hydronium ($H_3O^+$) ions, raising the pH, and causing the dissolved salt to fall out of solution and be precipitated on the surface. The acid and metal reaction also creates iron phosphate locally which may also be deposited, such as zinc phosphate or manganese phosphate. In some embodiments, the acid and metal reaction also generates hydrogen gas in the form of tiny bubbles that adhere to the surface, e.g., deposition surface, of the metal being treated. The presence of the hydrogen bubbles adhering to the deposition surface can prevent the acid from reaching the metal being treated and slows down the reaction. To overcome the formation of hydrogen bubbles at the deposition surface during the phosphating pre-treatment process, sodium nitrite may be added to act as an oxidizing agent that reacts with the hydrogen to form water. In this example, hydrogen is prevented from forming a passivation layer on the surface by the oxidant additive. In one embodiment, the process sequence for a phosphating pre-treatment process includes cleaning the deposition surface, rinsing, surface activation, phosphating, rinsing and drying. Surface activation may include activating the metal with, for example, a titanium based alkali chemical, to obtain fine crystalline structure for phosphate coating, which will increase corrosion resistance and adhesion properties. Prior to phosphating, the substrate is degreased (using organic solvents and/or an alkaline cleaner), roughened (via sand blasting), with rinsing between each of these steps (with distilled or deionized water).

In addition to phosphating, other pre-treatment processes that are suitable for use with the present disclosure include oxide coatings. Oxide coatings are in fact corrosion products having a thickness of less than 0.25 microns, which provide for good adhesion of the later formed coating. Oxide coatings may be formed using heat, chemical reaction or electrochemical reactions. Some examples of oxide coating processes suitable for the pretreatment of the deposition surface include gun-bluing oxidation, oxides formed from chemical baths, and anodizing.

In other embodiments, the pre-treatment process for treating the deposition surface prior to coating may be chromate coatings. Chromate coating are a chemical conversion process. Chromate coatings may be formed by reaction of water solutions of chromic acid or chromium salts. Chromate coatings as a pre-treatment process may be applied to metal deposition surfaces, such as aluminum surfaces, zinc surfaces, cadmium surfaces and magnesium surfaces.

It is noted that the above description of pre-treatment processes are provided for illustrative purposes only and are not intended to limit the present disclosure. It is further noted that the above described pre-treatment processes may be optional in some of the following described deposition methods for forming the coating.

In one embodiment, the deposition method employs physical vapor deposition (PVD) to form a coating including the inorganic materials having the metal chalcogenide composition and the fullerene-like geometry and/or tubular-like geometry. Physical vapor deposition (PVD) is a process to produce a metal deposition species that can be deposited on electrically conductive materials as a thin adhered pure metal or alloy coating. The process may be carried out in a vacuum chamber at high vacuum ($10^{-6}$ torr). Examples of PVD processes include plating, single target sputtering, dual target sputtering, cathodic arc deposition, electron beam physical vapor deposition, evaporation deposition, pulsed laser deposition, and combinations thereof.

Cathodic arc deposition is a PVD method, in which a high power electric arc discharged at the target (source) material blasts away some into highly ionized material to be deposited onto the workpiece. Electron beam physical vapor deposition is a PVD method in which the material to be deposited is heated by electron bombardment in a vacuum and is transported by diffusion to be deposited by condensation on the (cooler) workpiece, i.e., deposition surface. Evaporative deposition is a PVD method, in which the material to be deposited is heated to a high vapor pressure by electrically resistive heating in a "low" vacuum. Pulsed laser deposition is a PVD method in which a high power laser ablates material from the target into a vapor. As used herein, "sputtering" means a method of depositing a film of material on a deposition surface, in which a target of the desired material, i.e., source, is bombarded with particles, e.g., ions, which knock atoms from the target, and the dislodged target material deposits on the deposition surface. Examples of sputtering apparatuses include DC diode type systems, radio frequency (RF) sputtering, magnetron sputtering, and ionized metal plasma (IMP) sputtering.

In each of the above described PVD methods, a target is provided as a source material for deposition. To provide the coatings of the present disclosure the target may include a powder of the base material layer in combination with the inorganic materials having the metal chalcogenide composition and the fullerene-like geometry and/or tubular-like geometry. When the target includes both the material for the base material layer and the inorganic materials having the metal chalcogenide composition and the fullerene-like geometry and/or tubular-like geometry, the system may be referred to as a single target. The material for the base material layer and the inorganic materials having the metal chalcogenide composition and fullerene-like geometry and/or tubular-like geometry may be milled together to provide a sufficient particle size using at least one of high-shear mixers, two or three roll mixers, homogenizers, bead mills, ultrasonic pulverizer, attritor, agitator, ball mill, bead mill, basket mill, colloid mill, high speed disperser, edge runner, jar mill, low speed paddle mixer, variable speed mixer, paste mixer, ribbon blender, pug mixer, nauta mixer, sand/perl mill, triple roll mill, two roll mill, planetary mixer, slow speed mixer, high speed mixer, twin shaft mixer, multi shaft mixer, sigma kneader, rotor-Stator mixer, homogenizer/emulsifier, high shear mixer, conical blender, V-blender, double cone blender, suspended mixer and combinations thereof. In some embodiments, a fluid medium, such as water or an alcohol, is employed during milling. In other embodiments, two targets may be employed in the physical vapor deposition (PVD) process. For example, one target may provide the source for the base material layer, and a second target may provide the source for the inorganic materials having the metal chalcogenide composition and the fullerene-like geometry and/or tubular-like geometry.

In some embodiments, when forming the target for the physical vapor deposition (PVD) method the particles of the metal chalcogenide may be functionalizing with an agent that is selected from the group consisting of non-anionic surfactants, anionic surfactants, cationic surfactants, zwitterionic surfactants, surfactants, silanes, thiols, polymers and dopants.

Following formation of the target, the deposition surface may be cleaned of any oxide or surface residue, and the coating may be applied by the physical vapor deposition (PVD) process.

In another aspect of the present disclosure, the coating may be deposited using an electroplating process. Electroplating is a process that uses electrical current to control the flow of charged particles, such as metal cations and anions, so that they form a coherent metal coating on an electrode, which may provide the deposition surface. The process used in electroplating is called electrodeposition. It is analogous to a galvanic cell acting in reverse. The part to be plated is the cathode of the circuit. In one technique, the anode is made of the metal to be plated on the part. Both components are immersed in a solution called an electrolyte containing one or more dissolved metal salts as well as other ions that permit the flow of electricity. A power supply supplies a direct current to the anode, oxidizing the metal atoms that comprise it and allowing them to dissolve in the solution. At the cathode, the dissolved metal ions in the electrolyte solution are reduced at the interface between the solution and the cathode, such that they "plate out" onto the cathode.

In one embodiment, both the component that provides the base material layer in combination with the inorganic materials having the metal chalcogenide composition and the fullerene-like geometry or tubular-like geometry are positioned within the plating solution.

In one example, the electroplating process is a chrome plating process applied to a steel bearing, in which the chrome plating includes an inorganic material of a tungsten disulfide ($WS_2$) or molybdenum disulfide ($MoS_2$) composition having a fullerene-like geometry and/or tubular-like geometry. In one example, a chrome plating process includes degreasing of the deposition surface to remove soiling and placement of the deposition surface into a chrome plating vat. Once the deposition surface is present in the chrome plating vat it is allowed to warm to solution temperature, and a plating current is applied to the system, under which the deposition surface is left for the required time to attain thickness. In some embodiments, the electroplating method may include non-anionic, anionic, cationic, zwitterionic, surfactants, silanes, thiols, polymers to functionalize a surface of a deposition precursor for the coating method. The electroplating method may further include doping and alloying.

Hexavalent chromium plating, also known as hexchrome, $Cr^{+6}$, and chrome (VI) plating, uses chromic anhydride, also known as chromium trioxide, as the main ingredient of the plating bath that is contained within the plating vat. In another embodiment, the chromium bath is a mixture of chromium trioxide ($CrO_3$) and sulfuric acid (sulfate, $SO_4$). Trivalent chromium plating, also known as trichrome, $Cr^{+3}$, and chrome (III) plating, uses chromium sulfate or chromium chloride as the main ingredient of the plating bath. The inorganic material of tungsten disulfide ($WS_2$) or molybdenum disulfide ($MoS_2$) composition having a fullerene-like geometry and/or tubular-like geometry may be included in the plating bath for incorporation into the coating during plating of the deposition surface. The inorganic material of a tungsten disulfide ($WS_2$) or molybdenum disulfide ($MoS_2$) composition having a fullerene-like geometry and/or tubular-like geometry may be functionalized to provide the appropriate charge for plating to the deposition surface.

In another embodiment, the coating may be formed by chemical vapor deposition (CVD). Chemical vapor deposition (CVD) is a deposition process in which a deposited species is formed as a result of a chemical reaction between gaseous reactants at greater than room temperature, wherein solid product of the reaction is deposited on the surface on which a film, coating, or layer of the solid product is to be formed. Variations of CVD processes suitable for providing at least one element of the coating include, but are not limited to: Atmospheric Pressure CVD (APCVD), Low Pressure CVD (LPCVD), Plasma Enhanced CVD (PECVD), Metal-Organic CVD (MOCVD), atomic layer deposition, and combinations thereof.

In yet another embodiment, the coating may be formed by solvent transport medium a coating on the deposition surface includes particles of a metal chalcogenide comprising a fullerene-like geometry, a tubular-like geometry or a combination of fullerene-like geometries and tubular-like geometries particles, wherein the metal chalcogenide composition has a molecular formula of $MX_2$. In some embodiments, the coating formed by the solvent transport medium may be one method that can be employed for forming a coating including a polymeric base material, e.g., a polymer provides the matrix phase of the coating containing a dispersed phase of nanospheres with a fullerene-like geometry and/or tubular like geometry, and metal chalcogenide composition with a molecular formula $MX_2$. In some embodiments, when the coating includes a polymeric base material, a pre-treatment process, such as phosphating with manganese phosphate, zinc phosphate, and/or iron phosphate, is applied to the deposition surface prior to applying the coating.

The solvent transport medium may include an aqueous medium or alkyds, acrylics, vinyl-acrylics, vinyl acetate/ethylene (V AE), polyurethanes, polyesters, melamine resins, epoxy, or oil based medium. The solvent transport medium applied to the deposition surface using at least one of brushing, dipping, spraying, curtain coating and combinations thereof. The solvent transport medium may include non-anionic surfactants, anionic surfactants, cationic surfactants, zwitterionic surfactants, surfactants, silanes, thiols, polymers, doping and alloying additives to functionalize a surface of the particles of the metal chalcogenide.

In some embodiments, such as the embodiments in which the coating includes a polymeric base material, the solvent for applying the coating may include alcohols, such as ethanol and isopropanol, pyrrolidones, such as N-Methyl-2-pyrrolidone (NMP) and N-ethyl-2-pyrrolidone (NEP), xylenes, ethylbenzene, and n-butyl-acetate. Some examples of solvents that are suitable for forming coatings by solvent transport medium include acetic acid, acetone, acetonitrile, benzene, n-butanol, butyl acetate, carbon tetrachloride, chloroform, cyclohexane, 1,2-dichloroethane, dichloromethane, dimethylformamide, N,N-dimethylacetamide (DMAC), propylene carbonate (PC), dimethyl sulfoxide, dioxane, ethanol, ethyl acetate, di-ethyl ether, heptane, hexane, methanol, methyl-t-butyl ether, methyl ethyl ketone, pentane, n-propanol, iso-propanol, di-iso-propyl ether, tetrahydrofuran, toluene, trichloroethylene, water, xylene and combinations thereof. Xylene (also referred to as Dimethylbenzenes) is an aromatic hydrocarbon consisting of a benzene ring with two methyl substituents. Xylene as a solvent transport medium may xylenes having a molecular formula of $C_8H_{10}$, $C_6H_4(CH_3)_2$ or combinations thereof. In some examples, xylene may include ortho-xylene (1,2-Dimethylbenzene), meta-xylene (1,3-Dimethylbenzene), para-xylene (1,4-Dimethylbenzene) and combinations thereof.

In some embodiments, in which the coating includes a base layer of a polymer containing a dispersed phase of the inorganic material of a metal chalcogenide composition with a fullerene like or tubular-like geometry, such as tungsten disulfide ($WS_2$), the coating method may begin with forming a dispersion. When the inorganic material of a metal chalcogenide composition with a fullerene like or tubular-like geometry has a geometry with a greatest dimension greater than $10^{-6}$ nm, the dispersion may be a suspension, in which the inorganic material of a metal chalcogenide composition with a fullerene like or tubular-like geometry can settle from suspension, but may be reintroduced into the suspension by agitation by a mechanical means, e.g., by shaking or stirring. In some examples, additives may be employed to improve the stability of the dispersion. For example, in some embodiments, when the inorganic material of a metal chalcogenide composition with a fullerene like or tubular-like geometry has a geometry with a greatest dimension of $10^{-9}$ nm, the dispersion is a suspension, in which the metal chalcogenide with a fullerene like or tubular-like geometry stays in suspension. In other embodiments, when the inorganic material of a metal chalcogenide composition with a fullerene like or tubular-like geometry has a geometry with a greatest dimension ranging from $10^{-6}$ nm to $10^{-8}$ nm, the dispersion is a colloidal dispersion, in which the metal chalcogenide with a fullerene like or tubular-like geometry stays in suspension.

In some embodiments, the dispersion for forming the coating may include at least one solvent, at least one precursor for polymer formation and a metal chalcogenide having a molecular formula $MX_2$ and a fullerene and/or tubular-like geometry. For example, the amount of metal chalcogenide having a molecular formula $MX_2$ and a fullerene and/or tubular-like geometry in the dispersion may range from 0.1 wt. % to 50 wt. %. In another example, the amount of metal chalcogenide having a molecular formula $MX_2$, and a fullerene and/or tubular-like geometry in the dispersion may range from 0.1 wt. % to 20 wt. %. In different embodiments, the amount of metal chalcogenide in the dispersion may be at least 16 wt. %, 17 wt. %, 18 wt. %, 19 wt. %, 20 wt. %, 21 wt. %, 22 wt. %, 23 wt. %, 24 wt. %, 25 wt. %, 26 wt. %, 27 wt. %, 28 wt. % nm, 29 wt. %, 31 wt. %, 32 wt. %, 33 wt. %, 34 wt. % or 35 wt. % or any range therebetween (e.g., 15 wt. % to 20 wt. %, 20 wt. % to 25 wt. %, 25 wt. % to 30 wt. %, or 30 wt. % to 35 wt. %), or between any of the foregoing values and up to or less than 50 wt. %. The metal chalcogenide may be any of the above described compositions having the molecular formula $MX_2$, such as tungsten disulfide ($WS_2$). In some embodiments, the metal chalcogenide may include more than one composition. For example, the metal chalcogenide composition with a fullerene like or tubular-like geometry may include a portion of tungsten disulfide $WS_2$ in combination with molybdenum disulfide $MoS_2$. Other particles may also be introduced to this dispersion, e.g., graphite and $MoS_2$ platelets.

The amount of polymer precursor in the dispersion may from 5 wt. % to 40 wt. %. In another example, the amount of polymer precursor in the dispersion may range from 7 wt. % to 15 wt. %. In different embodiments, the amount of polymer precursor in the dispersion may be at least 5 wt. %, 6 wt. %, 7 wt. %, 8 wt. %, 9 wt. %, 10 wt. %, 11 wt. %, 12 wt. %, 13 wt. %, 14 wt. %, 15 wt. %, 16 wt. %, 17 wt. %, 18 wt. %, 19 wt. % or 20 wt. % or any range there between (e.g., 5 wt. % to 10 wt. %, 10 wt. % to 15 wt. %, or 15 wt.

% to 20 wt. %, or between any of the foregoing values and up to or less than 30 wt. %. The polymer precursor may be any material that can provide one of the aforementioned polymers for the base layer of the coating. For example, the polymer precursor may provide a polyamide and/or polyamide imide.

The amount of solvent in the dispersion may range from 20 wt. % to 90 wt. %. In another example, the amount of solvent in the dispersion may range from 50 wt. % to 90 wt. %. In different embodiments, the amount of solvent in the dispersion may be at least 40 wt. %, 42 wt. %, 44 wt. %, 46 wt. %, 48 wt. %, 50 wt. %, 52 wt. %, 54 wt. %, 56 wt. %, 58 wt. %, 60 wt. %, 62 wt. %, 64 wt. % or 65 wt. % or any range therebetween (e.g., 40 wt. % to 45 wt. %, 45 wt. % to 55 wt. %, 55 wt. % to 60 wt. % or 60 wt. % to 65 wt. %), or between any of the foregoing values and up to or less than 70 wt. %. The solvent may include any the aforementioned solvents. For example, the solvent may include a combination of NMP (M-methyl-2-pyrrolidone), xylene, and ethylbenzene. The solvent content can be set to provide a concentrated dispersion product that is to be diluted by the customer prior to use, or at a solvent content for use without dilution.

In some embodiments, the dispersion may further include a carbon containing material, such as graphite, carbon black or carbon nanotubes.

In some embodiments, the dispersion may be formed by mixing the solvent, polymer precursor, the metal chalcogenide having a molecular formula $MX_2$ and a fullerene and/or tubular-like geometry, and the optional carbon containing material through the use of a mixer, such as two or three roll mixers, homogenizers, bead mills, ultrasonic pulverizer, ribbon blender, v blender, colloid mills, stirrers, agitators, blending systems, continuous processor, cone screw blender, double planetary, counter-rotating, vacuum mixer, dispersion mixer, magnetic stirrers, high shear mixtures and variations thereof.

In one example, in which the dispersion is formed in a high-shear mixer, such as a high speed mixer sold under the tradename DISPERMAT® by VMA-GETZMANN GMBH. The high-shear mixer may include a double jacket for containing the cooling liquid. The high shear mixture may employ metallic media beads, e.g., 2 mm diameter media, or ceramic media beads, e.g., 0.4 m to 0.6 mm diameter ceramic media. A nylon impeller is used to stir the media and the material being formed into the dispersion. The vessel of the high-shear mixture is connected to a cooling system, and sealed during the mixing process to eliminate evaporation of solvents.

In another example, in which the dispersion is formed in a stirred bead mill, such as a stirred bead mill produced by WAB, the media to form the dispersion may be stirred in a vessel, and pumped into a closed chamber with $ZrO_2$ beads that stir at a high velocity. The grinded media may be circulated and stirred from between the chamber and the vessel of the stirred bead mill.

Table 1 is the composition of one example of a dispersion, in accordance with the present disclosure.

TABLE 1

| EXAMPLE: DISPERSION COMPOSITION | |
| --- | --- |
| MATERIAL | PERCENTAGE (BY WT. %) |
| NMP (M-methy-2-pyrrolidone) | 42.6 |
| PAI (poly-amide-imide) | 6.4 |
| Tungsten disulfide ($WS_2$) | 21 |
| Xlyene | 22.7 |
| Ethylbenzene | 7.3 |

For the composition of the dispersion that is described in Table 1, the media beads, e.g., 0.8 mm ceramic beads, of the high shear mixer or the stirred bead mill may be present at approximately 267 gram beads per 100 grams of material being mixed in forming the dispersion.

In one embodiment, the procedure for mixing the dispersion for forming the coating having the polymeric base material in a high shear mixer includes dissolving the polymer precursor, e.g., poly-amide-imine (PAI), in solvent, such as NMP (M-methyl-2-pyrrolidone). For example, mixing the polymer precursor with solvent, may include pouring a measured amount of solvent into the vessel of the stirring apparatus followed by adding metal and/or ceramic media beads. The polymer precursor material, e.g., poly-amide-imide (PAI), may then be added to the solvent and media that is contained within the vessel, wherein the mixture is stirred for 5 minutes to 30 minutes, e.g., 15 minutes, under cooling and sealing.

In a following step, the metal chalcogenide having the molecular formula $MX_2$ and a fullerene and/or tubular-like geometry, e.g., fullerene geometry tungsten disulfide $WS_2$, may then be added to the mixture of the polymer precursor and solvent in the vessel of the high shear mixer. In some embodiments, when the optional carbon-containing material is being introduced, the carbon containing material can be mixed into the mixture of the polymer precursor and the solvent with the metal chalcogenide having the molecular formula $MX_2$ and a fullerene and/or tubular-like geometry. In some embodiments, a homogeneous mix of inorganic fullerene-like and/or tubular particles with carbon-containing materials is provided by premixing the inorganic material having the metal chalcogenide composition and the fullerene-like and/or tubular-like geometry with the carbon containing material.

In one embodiment, the premixing step for mixing the inorganic material having the metal chalcogenide composition and the fullerene-like and/or tubular-like geometry with the carbon containing material may be done by dry mixing. In another embodiment, the premixing step may employ a solvent as a mixing media, such as alcohol. Examples of mixing media that are suitable for mixing the inorganic material having the metal chalcogenide composition and the fullerene-like and/or tubular-like geometry with the carbon containing materials include an alcohol, such as methyl alcohol, ethyl alcohol, isopropyl alcohol, propanol, butanol, hexanol, heptanol, octanol, ethylene glycol, glycerol and combinations thereof. In another embodiment, the mixing media may be an inert solvent. The carbon containing material and is optional and may be omitted from the dispersion.

The combination of the metal chalcogenide having the molecular formula $MX_2$ and a fullerene and/or tubular-like geometry, the polymer precursor, the solvent and the optional carbon containing material may then be stirred for three hours to nine hours. In one example, stirring of the metal chalcogenide, polymer precursor, and the solvent may be mixed for six hours. In one embodiment, the dispersion may be finalized by adding additional solvent, such as xylene, ethylbenzene and combinations thereof. The function of xylene and ethylbenzene is to form a liquid that is paintable (via spray, brush etc.), they are used as thinners for the highly viscous mixture based on PAI in NMP. The mixture may then be stirred for an additional 5 minutes to 20 minutes, e.g., 15 minutes. The media from the high shear mixer may then be sieved from the dispersion, and the dispersion may then be stored for use. It is important to store it in a sealed vessel, e.g. a metallic can, in order to prevent water absorption and degradation.

In another aspect of the present disclosure, the dispersion of solvent, polymer precursor, the metal chalcogenide having a molecular formula $MX_2$ and a fullerene and/or tubular-like geometry, and the optional carbon containing material may be applied to a metal surface to form a coating of a polymeric base layer (also referred to as polymer matrix) with a dispersed phase of the inorganic material of a metal chalcogenide composition with a fullerene like or tubular-like geometry, and an optional dispersed phase of carbon containing material. In some embodiments, the dispersion provides nanoparticulate suspension in a carrier solvent, which is to be applied to a deposition surface via brushing, dipping or spraying to form a coating that reduces the coefficient of friction (COF) and wear of the deposition surface. In some embodiments, the dispersion allows for shipping of the product to an intended user, which allows for storage of the dispersion until it is used in a coating application.

In some embodiments, the application of the dispersion of solvent, polymer precursor, the metal chalcogenide having a molecular formula $MX_2$ and a fullerene and/or tubular-like geometry, and the optional carbon containing material may be applied to a metal surface to form a coating of a polymeric base layer (also referred to as polymer matrix) using a process sequence that includes surface conditioning for the deposition surface, phosphating the deposition surface, and spraying the dispersion onto the depositions surface to form a coating. In this example, the deposition surface may be an iron containing surface, such as carbon steel.

In one embodiment, the conditioning step for applying the coating from the dispersion, such as the dispersion having the composition in Table 1, to the deposition surface may begin with sonicating the deposition surface in a hot chemical soap, i.e, 80 parts water: 20 parts soap. The time period for sonicating may range from 10 minutes to 20 minutes. In one example, the time period for sonicating may be on the order of 15 minutes. Another form of treatment with chemical soap may be via an alkaline formula designated for metal cleaning, e.g. Enprep Q576.

In one embodiment, the phosphating step may include mixing all of the phosphating ingredients in a container suitable, such as a glass container, for the deposition surface to be phosphated and heated to a temperature ranging from 95° C. to 98° C. The phosphating ingredients for treating an iron containing deposition surface, such as carbon steel, may include the composition of Table 2, as follows:

TABLE 2

EXAMPLE: PHOSPHATING COMPOSITION

| MATERIAL | AMOUNT |
|---|---|
| Ento-Phos MN-850 | 26-30 ml |
| DDW (doule distilled water) | 170 ml |
| Iron sulfate | 300 mg-480 mg |

In another embodiment, a surface treatment is provided by a designated chemical bath (made of, e.g. polystyrene) with built in heater, agitation setup (e.g. condensed air outlet pipe), and a thermometer. Additionally, there are other phosphating processes that are suitable for use with the present disclosure including different materials and conditions. For example, a process of zinc-phosphate surface exchange treatment may be employed at a temperature ranging from 60° C.-88° C. with the following composition including Amphos in an amount ranging from 300-240 ml, Amphos in an amount ranging from 504-480 ml, DDW (doule distilled water) to complete to 12 L, and sodium carbonate (soda ash) at approximately 5 grams.

The deposition surface may be dipped in the solution described in Table 2 for a time period ranging from 5 minutes to 30 minutes. For example, the time period for submersion of the deposition surface within the phosphating solution may range from 6 minutes to 15 minutes. The time period of the phosphating treatment may vary depending on the size and geometry of the deposition surface. In some examples, the time period for phosphating may continue until the formation of bubbles within the phosphating solution becomes seldom. The formation of bubbles indicate the phosphate exchange process at the surface, when an equilibrium is formed, the bubbles stop. Following the submersion time in the phosphating solution, the component including the deposition surface is removed from the phosphating solution and washed with water, such as double distilled water. It is noted that any of the above mentioned pretreatment processes for surface treating the deposition surface prior to forming the coating may be substituted for the phosphating step.

The deposition surface may then be coated. For example, a dispersion, as described above, e.g., the dispersion described in Table 1, may be applied using a spray deposition process. In one example, the spray deposition process includes a device to spray a coating (paint, ink, varnish, etc.) through the air onto the deposition surface. For example, the spray deposition process may include the use of an air-pressurized spray gun with an air source provided by an air compressor. In one example, in a manual operation method the air-gun sprayer is positioned about 6 inches to 10 inches (15-25 cm) from the deposition surface, and moved back and forth over the deposition surface, each stroke overlapping the previous to ensure a continuous coat.

In an automatic process the gun head is attached to a mounting block and delivers the stream of dispersion material for forming the coating having the polymeric material from that position. The deposition surface being coated is usually placed on rollers or a turntable to ensure overall equal coverage of all sides.

In some embodiments, the air spay system may be a HVLP (High Volume Low Pressure) system, in which the spray gun use 8-20 cfm (13.6-34 m$^3$/hr); or a LVLP (Low Volume Low Pressure), which operates at a lower pressure and lower volume of air than HVLP systems. In another embodiment, the coating may be applied by electrostatic spray painting. In electrostatic spray painting or powder coating, the atomized particles of the dispersion are electrically charged, thereby repelling each other and spreading themselves evenly as they exit the spray nozzle of the gun. The deposition surface being coated is charged oppositely or grounded. The dispersion for the coating is then attracted to deposition surface giving a more even coat than wet spray painting, and also greatly increasing the percentage of paint that sticks to the object. In other embodiments, the dispersion for the coating may be applied to the deposition surface using hot spray, air assisted airless spray guns, airless spray guns, automated linear spray systems, vacuum coating systems, automated flat line spray systems and combinations thereof.

It is noted that spraying is only one example of a deposition method for applying the dispersion for forming the coating onto the deposition surface. It is noted that other methods for applying the dispersion to the deposition surface include brushing, dipping or curtain coating.

Following application of the coating onto the deposition surface, e.g., spraying of the dispersion onto the deposition surface, the coating may be dried. For example, drying of the coating may begin with ambient drying, i.e., drying at room temperature, e.g., 20° C. to 25° C., for a time period of 15 minutes to 1 hour, e.g., 30 minutes. In some cases, this step is skipped, in order to avoid water absorption to the coating, and the coated substrate is directly heated to 60-80° C. Following ambient drying, the coating may be dried at temperature of 60° C. to 100° C., e.g., 90° C., for 15 minutes to 1 hour, e.g., 30 minutes. In a following process step, the coating may be cured at a temperature ranging from 200° C. to 240° C., e.g., 220° C., for 15 minutes to 1 hour, e.g., 30 minutes. The temperature of the coating may be increased using furnaces, ovens, induction heaters, resistance heaters, and combinations thereof. Following curing, the coating may be allowed to cool to room temperature.

Figure 5:
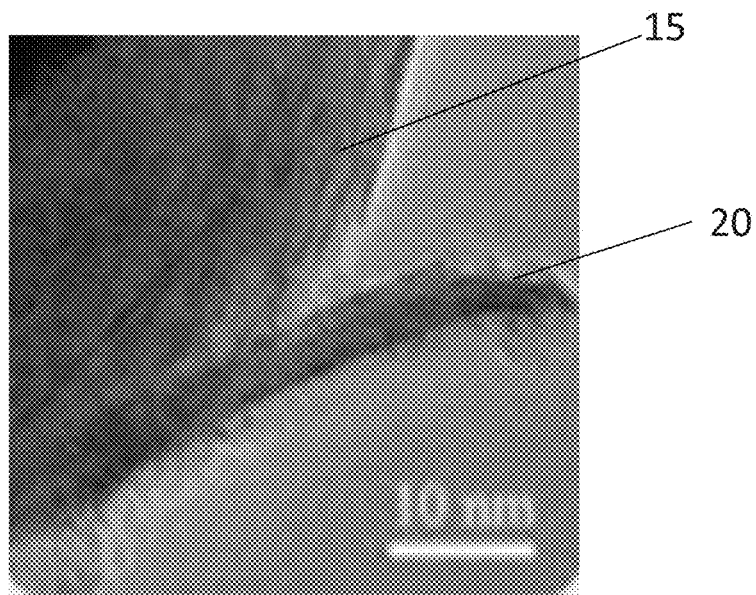
FIG. 5 is transmission electron microscope (TEM) image of a multi-layered nanosphere of metal chalcogenide having a molecular formula $MX_2$ with a fullerene-like geometry under a stress that exfoliates tribofilm lamellas that fill and re-smoothen damaged surfaces, in accordance with one embodiment of the present disclosure.

FIG. 5 depicts one embodiment of how continuous friction applied to a metal chalcogenide of tungsten disulfide ($WS_2$) having a fullerene like geometry 15 will exfoliate the outer layers of material onto a frictional surface that is applying pressure to the tungsten disulfide material, wherein the exfoliating outer layers create a tribofilm layer 20. A "tribofilm" is defined as a thin solid film generated as a consequence of sliding contact, which is adhered on a contacting, i.e., frictional, surface, but has different chemical composition, structure and tribological behavior than the contacting surface.

Figure 6:
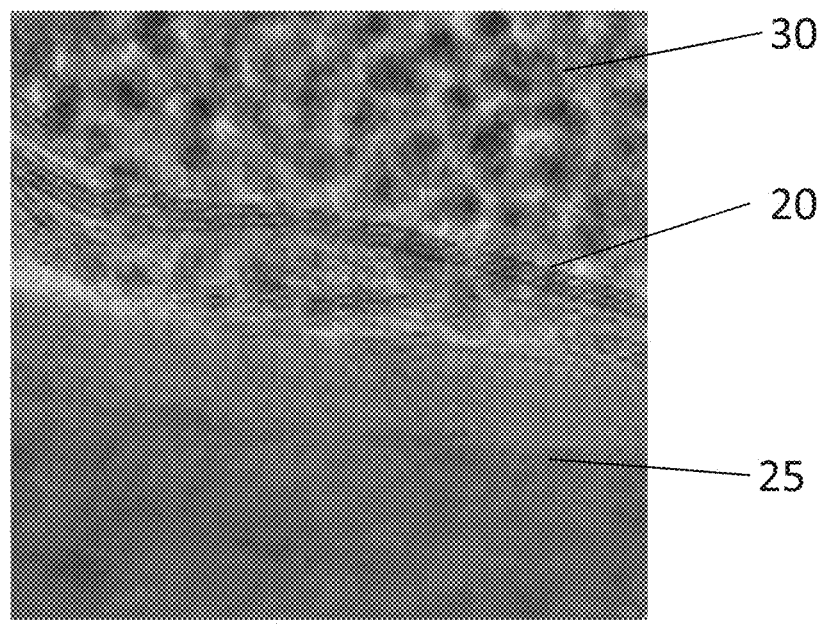
FIG. 6 is a transmission electron microscope (TEM) image of a surface coated with the tribofilm.
Figure 4A:
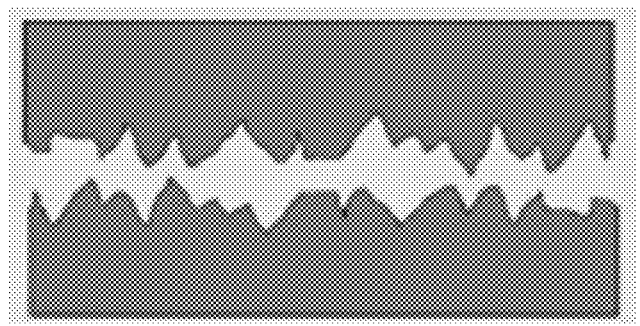
FIG. 4A is an illustration depicting a non-coated surface.
Figure 4B:
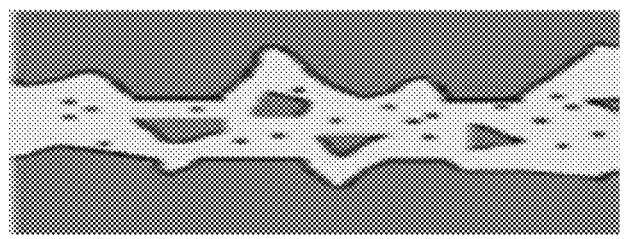
FIG. 4B is an illustration depicting a non-coated surface under friction.

One example, of a tribofilm layer 20 formed on a surface 25 is depicted in FIG. 6. The exfoliated nano-particle layers accumulate in wear crevices in the surface 25 that the tribofilm layer 20 is formed on, and attaches to the metal surface, creating a continuous super-lubricating tribofilm layer 20. The exfoliated tribofilm layers from the metal chalcogenide of the coating may be referred to as lamellas. The lamellas orient parallel to the deposition surface in the direction of the frictional motion. Even between highly loaded stationary surfaces the lamellar structure is able to prevent contact.

In some embodiments, the tribofilm layer 20 provides a damping effect to absorb shock between the surface 25 that the tribofilm layer 20 is formed on an a second surface that the tribofilm layer 20 is formed on. The particles, being closed-cage, absorb pressure. Additionally, in the direction of motion the lamellas of the tribofilm layer 20 easily shear over each other resulting in a low friction. The lubricating tribofilm layer 20 repairs wear damage, prevents further wear, reduces the coefficient of friction and reduces the local temperature.

Dynamic mechanical systems, such as certain parts within combustions engines used in transportation applications, which withstand friction conditions with a metallic counterpart can be modified with a polymer film (in thickness of a few μm and up, depending on the required tolerance) including dispersed phase of the inorganic material of a metal chalcogenide composition with a fullerene like or tubular-like geometry. The significance of such a film is both in reducing the coefficient of friction (COF), and in impeding the wear of the surface. For example, main crankshaft (slide-journal) bearings of vehicles work normally under hydrodynamic lubrication regime. However, under certain conditions, e.g., the beginning of engine run and high-cornering of vehicles, local 'oil-starvation' occurs at bearing surfaces, resulting in mixed or even boundary lubrication conditions. In vehicles employing fuel-efficient technologies, such as 'start-stop' and hybrid engines, this difficulty is amplified.

Figure 7A:
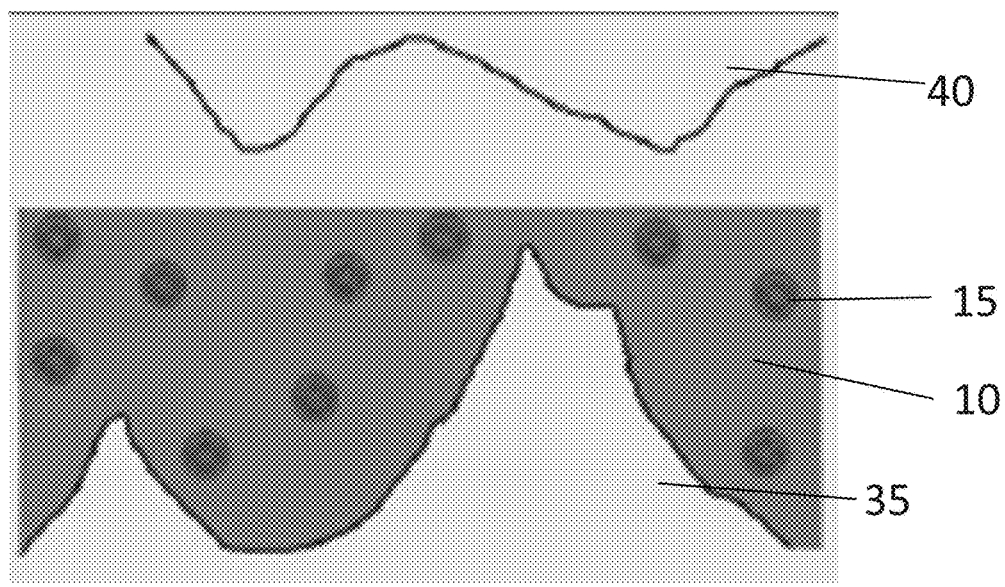
FIG. 7A is an illustration depicting a surface that has been coated with a coating including a polymeric base material and a dispersed phase of metal chalcogenide having a molecular formula $MX_2$ and a fullerene-like geometry, in accordance with one embodiment of the present disclosure.
Figure 7B:
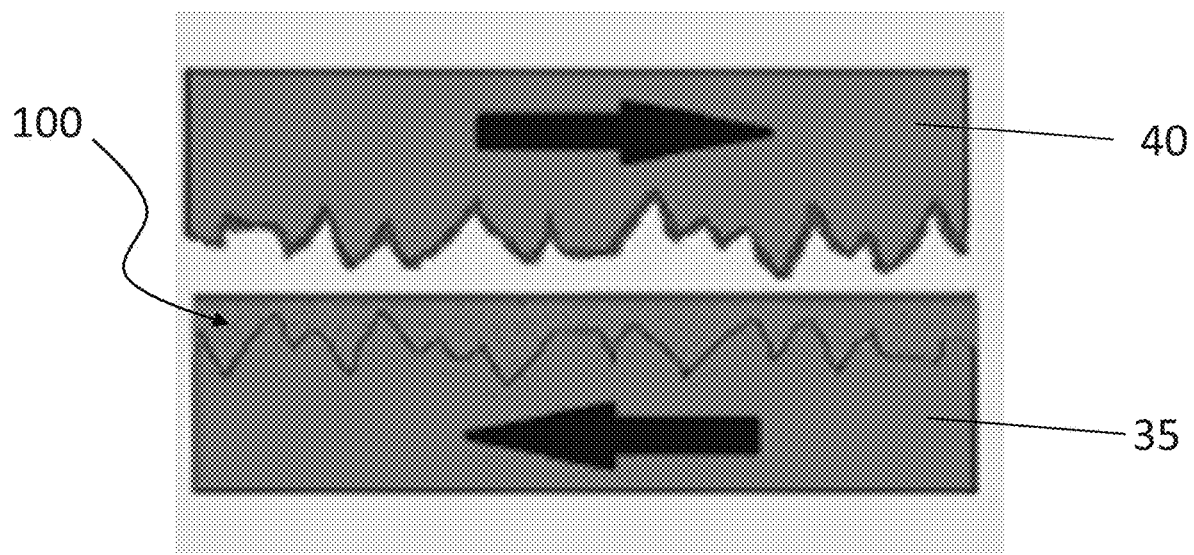
FIGS. 7B and 7C are illustrations depicting the application of a friction force to the surface that has been coated with a coating including a polymeric base material and a dispersed phase of metal chalcogenide having a molecular formula $MX_2$ and a fullerene-like geometry, in accordance with one embodiment of the present disclosure.
Figure 7C:
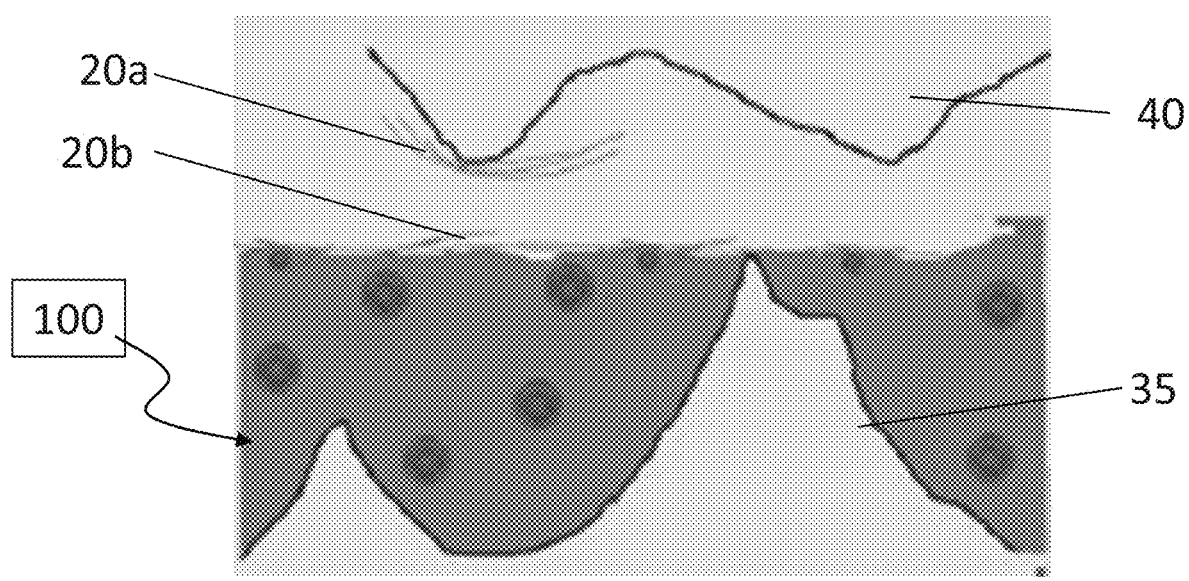

Referring to FIGS. 7A-7C, a polymer coating 100 containing metal chalcogenide, e.g., tungsten disulfide $WS_2$, with a fullerene like or tubular-like geometry 15 decreases the coefficient, protects the bearing surface 35 and prevents its wear, thanks to its inherent active protection layer. FIG. 7A depicts the polymer coating 100 on a bearing surface 35 prior to the application of frictional force, such as contact between the frictional contact surface 40 and the polymer coating 100. Frictional contact between the polymer coating 100 that is present on the bearing surface 35 and the friction contact surface 40 is depicted in FIG. 7B, in which motion between the frictional contacting surfaces is illustrated by the depicted arrows. As depicted in FIG. 7C, wear of a coating 100 including the chalcogenide of tungsten disulfide ($WS_2$) having a fullerene like geometry 15 creates a tribofilm 20a of exfoliated material of metal chalcogenide, e.g., tungsten disulfide $WS_2$, with a fullerene like or tubular-like geometry 15 from the polymer coating 100 on the surface 40 contacting the polymer coating 100. Further, exfoliated material of metal chalcogenide, e.g., tungsten disulfide $WS_2$, with a fullerene like or tubular-like geometry 15 from the polymer coating 100 can create a fresh tribofilm 20b on the coating 100 itself. Consequently, the coefficient of friction for the coated structure is constantly low. The phenomena described with reference to FIGS. 7A-7C prolong the life of the automotive components coated in accordance with the present disclosure, reduce fuel consumption, and increase vehicle reliability. Although, FIGS. 7A-7C describe the advantages of the exfoliated tribofilm from a coating having a polymeric base material, the description is equally applicable to all the coatings described in the present disclosure, so long as the coating contains inorganic metal chalcogenide having the composition $MX_2$, with a fullerene like or tubular-like geometry, such as tungsten disulfide $WS_2$.

The common coatings for metallic bearing surfaces are currently lead-based alloys (e.g. Babbitt), which are undesirable. Some alternatives to lead containing films are composed of polymers with an addition of PTFE, graphite and/or molybdenum disulfide. The first advantage of a polymer coating containing metal chalcogenide, e.g., tungsten disulfide $WS_2$, with a fullerene like or tubular-like geometry over these solid lubricants is their resistance to extreme conditions, namely, high pressures and temperatures.

For example, the shock-wave resistance of $WS_2$ nanotubes has been studied and compared to that of carbon nanotubes, in which it has been determined that $WS_2$ nanotubes are capable of withstanding shear stress caused by shock waves of up to 21 GPa. Under similar shock conditions, $WS_2$ tubes are more stable than carbon nanotubes, the latter being transformed into a diamond phase. In some embodiments, the supershock-absorbing ability of the IF-$WS_2$ enables them to survive pressures up to 25 GPa accompanied with concurrent temperatures of up to 1000° C. without any significant structural degradation or phase change. IF-$WS_2$ are stable in air at temperatures higher than 400° C.

Another advantage of the disclosed metal chalcogenide, e.g., tungsten disulfide ($WS_2$), with a fullerene like or tubular-like geometry is the high strength of the individual nanoparticles, i.e., tungsten disulfide (WS2), making the material that is coated more resistant to wear, which is another desirable property of a tribological coating in accordance with the present disclosure.

One application for the coating including particles of a metal chalcogenide comprising a fullerene-like geometry, a tubular-like geometry or a combination of fullerene-like geometries and tubular-like geometries is the automotive market, including both vehicle manufacturers and vehicle maintenance providers. For example, coatings in accordance with the present disclosure may be applied to internal combustion engine components, such as, pistons, piston rings, piston pins, crankshafts, crankshaft bearings, main bearings, camshafts, camshaft bearings, timing chain, timing gears, intake and exhaust valves, valve springs, valve guides, push rods, rocker arms, rocker arm shafts, hydraulic lifters, solid lifters, hydraulic roller lifters, solid roller lifters, camshaft followers, camshaft button, camshaft plug, compression rings, connecting rod bearings, connecting rod bolts, connecting rod caps, connecting rods, engine mounts, exhaust manifolds, exhaust valves, oil rings, pins, valve keepers, valve retainers, valve seats, and combinations thereof. In some embodiments, the coatings in accordance with the present disclosure may be applied to automotive transmission components, such as torque converter components, vacuum modulator components, accumulator rings, accumulator seals, bands, bearings, boost valves, bushings, chains, check balls, clips, clutch drums, clutch pistons, clutch plates, clutch seals, clutch packs, control rings, counter shafts, servo components, detent camshafts, gears, governor components, idler shafts, input shafts, intermediate shafts, output shaft, main shafts, manual valves, modulator valves, planetary gear carriers, planetary gears, pump gears, pump guide rings, pump vanes, ring gears, roller clutches, servo rings, servo seals, servo sleeve, shift forks, shift shafts, shift valves, shifter shaft, snap rings, shift solenoids, speedometer drive, sprags, sprockets, strators, strator shafts, sun gear shell, sun gears, synchronizer key(s), synchronizer ring, synchronizer sleeves, synchronizer(s), throttle valve, turbine, transfer shaft, valve body and associated components, valve pack and combinations thereof. The coating may also be applied to supercharger and turbo charger components, such as vanes, turbines, impellers, shafts, bearings and housings. In other embodiments, the coating may be applied to components of automotive front differential, rear differential and transfer cases. For example, the coating may be applied to pinion bearings, pinion gears, pinion flange, propeller shafts, "U" joints and "U" joint caps, pinion flange, propeller shafts, axle shafts, axle bearings and races, axle flange, axle shafts, CV joints, carrier bearings, center bearings, drive axle, drive axle bearings, drive shaft, flex disc, half shafts, pinion gear, pins, ring gear, shaft couplings, side gears, spyder gears, yoke, lock ring, pinion and related mechanisms. It is noted that the above description of automotive applications is provided for illustrative purposes only, and is not intended to limit the present disclosure. The coatings disclosed herein may be applied to any automotive component that experiences friction, and would benefit from a lower coefficient of friction coating, such as manual and automatic locking hub and bearing assembly, C/V axles, plain bearings, spindles, gears, chain elements, valves and combinations thereof.

Some other applications for the coatings may be include household and general maintenance, e.g. locking systems, springs, bolts, slides, and hinges etc. This could apply for any type of industrial mechanical system. In some other embodiments, the coatings disclosed herein may be applied to metal working applications, e.g., forging and wire drawing etc. In yet other embodiments, the coatings disclosed herein may be applicable to weapons (small-arms) lubrication. One of the advantages of the disclosed coatings for lubrication in weapons is the reduction or even total elimination of the use of liquid lubrication, which can increase the firearm maintenance intervals, and improve their performance in the battle field (solid lubrication is not prone to the absorption of moist and dry debris, such as its liquid equivalent).

In some embodiments, in comparison to a coating that does not include particles having the fullerene-like geometry and/or tubular-like geometry, the coating including the inorganic material of the metal chalcogenide composition having the fullerene-like geometry and/or tubular-like geometry provides a smoother surface, greater scratch resistance, reduced coefficient of friction and reduced wear. In some examples, a coating including the inorganic material of the metal chalcogenide composition having the fullerene-like geometry and/or tubular-like geometry will have up to 3× less wear, and up to 1.75 less friction, than a coating having a comparable base material layer without the inorganic material of the metal chalcogenide composition having the fullerene-like geometry and/or tubular-like geometry.

The following examples are provided to further illustrate the present invention and demonstrate some advantages that arise therefrom. It is not intended that the invention be limited to the specific examples disclosed.

EXAMPLES

Layered materials, such as molybdenum disulfide and graphite are in use worldwide in lubrication coating systems. In the present example, a coating having a polymer base material, and a dispersed phase of tungsten disulfide ($WS_2$) with the fullerene like geometry was prepared in accordance with the present disclosure is compared with existing lubricants that include molybdenum disulfide ($MoS_2$).

First, coating formulations having a polymer base material and a dispersed phase of tungsten disulfide ($WS_2$) with the fullerene like or tubular-like geometry were produced, in which one of the coating formulations intended for application via spray coating and a second coating formation is intended for application via brushing. The formulations are represented in the following Table 3:

TABLE 3

| Material | Spraying | Brushing |
|---|---|---|
| PAI (polyamide-imide) | 6.4 | 9.5 |
| NMP (N-methyl-pyrrolidone) | 42.6 | 38.0 |
| 3AG (IF powder) | 21.0 | 33.5 |
| Butyl acetate | | 19.0 |
| Ethyl benzene | 7.3 | |
| Xylene | 22.7 | |

The mixtures described in Table 3 were grinded for 8 hours in a high-shear mixer (Dispermat) with 0.6 mm ceramic beads.

The comparative molybdenum disulfide ($MoS_2$) products are included in Table 4, as follows:

TABLE 4

| Product | Manufacturer | polymer |
|---|---|---|
| Molykote D7620 | Dow Corning | PAI |
| Evercoat 643 | Everlube | Epoxy |
| Xylane 1052 | Whitford | classified |

The tribological characterization techniques used in this project were—Brugger test (DIN 51347) to measure its wear resistance, and roller on block (ASTM G77), to measure the COF. The results of the tribological testing are included in Table 5, as follows:

TABLE 5

| Product | Brugger [MPa] | COF |
| --- | --- | --- |
| Molykote D7620 | 112.5 | 0.013 |
| Ecoalube 643 | 170.9 | 0.054 |
| Xylane 1052 | 97.4 | 0.074 |
| WS$_2$ brushing product | 194.3 | 0.034 |
| Neat PAI | 24.1 | 0.049 |
| WS$_2$ spraying product | 180.0 | 0.040 |

While the claimed methods and structures has been particularly shown and described with respect to preferred embodiments thereof, it will be understood by those skilled in the art that the foregoing and other changes in form and details may be made therein without departing from the spirit and scope of the presently claimed methods and structures.

What is claimed is:

1. A coating composition:
an automotive friction deposition surface; and
a composite coating on the automotive friction deposition surface, the entirety of the composite coating being present on an exterior of the automotive friction deposition surface that is directly contacted in a friction causing event, the composite coating including a dispersed phase of particles of a metal chalcogenide comprising a fullerene-like geometry having a solid core, a tubular-like geometry having a solid core or a combination of the fullerene-like geometry having the solid core and the tubular-like geometry having the solid core, the dispersed phase being a multilayered structure having an outer layer comprising at least one sectioned portion, the at least one sectioned portion extends along a direction away from the curvature of the multilayered structure, the at least one sectioned portion engaged to remaining section of the outer layer, the dispersed phase of particles being present substantially throughout a matrix phase of a polymeric base material, the matrix phase being the majority component of the composite coating, the dispersed phase being present substantially extending from an interface of the composite coating with the deposition surface to an upper surface of the composite coating, wherein the metal chalcogenide composition has a molecular formula of $MX_2$, where M is a metallic element selected from the group consisting of titanium (Ti), vanadium (V), chromium (Cr), manganese (Mn), iron (Fe), cobalt (Co), nickel (Ni), copper (Cu), zinc (Zn), zirconium (Zr), niobium (Nb), molybdenum (Mo), technetium (Tc), ruthenium (Ru), rhodium (Rh), palladium (Pd), silver (Ag), cadmium (Cd), hafnium (Hf), tantalum (Ta), tungsten (W), rhenium (Re), osmium (Os), iridium (Jr), platinum (Pt), gold (Au), mercury (Hg) and combinations thereof, and X is a chalcogen element selected from the group consisting of sulfur (S), selenium (Se), tellurium (Te), oxygen (O) and combinations thereof.

2. The coating composition of claim 1, wherein the deposition surface is comprised of a material selected from the group consisting of a metal, a ceramic, a dielectric, a polymer or a combination thereof.

3. The coating composition of claim 1, wherein the base material is selected from the group consisting base material layer comprises a polymer selected from the group consisting of elastomers, epoxies, thermoplastic polymers, polyamides, polyphthalamide, polyphthalamide blend, polyamide-imide, polyethylene, cross-linked polyethylene, polyester, polyurethanes, polyproplenes, and combinations thereof.

4. The coating composition of claim 1, wherein the particles of the metal chalcogenide having said at least one of the fullerene-like geometry and the tubular-like geometry are present in the base material layer in an amount of greater than 0.1 wt %.

5. The coating composition of claim 1, wherein the particles of the metal chalcogenide having the molecular formula $MX_2$ are tungsten disulfide ($WS_2$), molybdenum disulfide ($MoS_2$) or a combination thereof.

6. The coating composition of claim 1, wherein the particles of the metal chalcogenide having the molecular formula $MX_2$ have a fullerene-like geometry and a diameter ranging from 5 nm to 5 µm, or the particles of the metal chalcogenide having the molecular formula $MX_2$ have a tube-like geometry and a diameter ranging 1 nm to 150 nm and a length ranging from 10 nm to 15 cm.

7. The coating composition of claim 1, wherein the particles of the metal chalcogenide are functionalized with at least one of non-anionic surfactants, anionic surfactants, cationic surfactants, zwitterionic surfactants, surfactants, silanes, thiols, polymers and dopants.

8. The coating composition of claim 1, wherein the base material is an epoxy.

9. The coating composition of claim 8, wherein the epoxy is selected from the group consisting of bisphenol A epoxy resin, bisphenol F epoxy resin, novolac epoxy resin, aliphatic epoxy resin, glycidylamine epoxy resin and combinations thereof.

* * * * *